M. F. KIESSLING.
MACHINE FOR MAKING SNAP FASTENERS.
APPLICATION FILED MAR. 17, 1916.
1,326,132.
Patented Dec. 23, 1919.
12 SHEETS—SHEET 1.
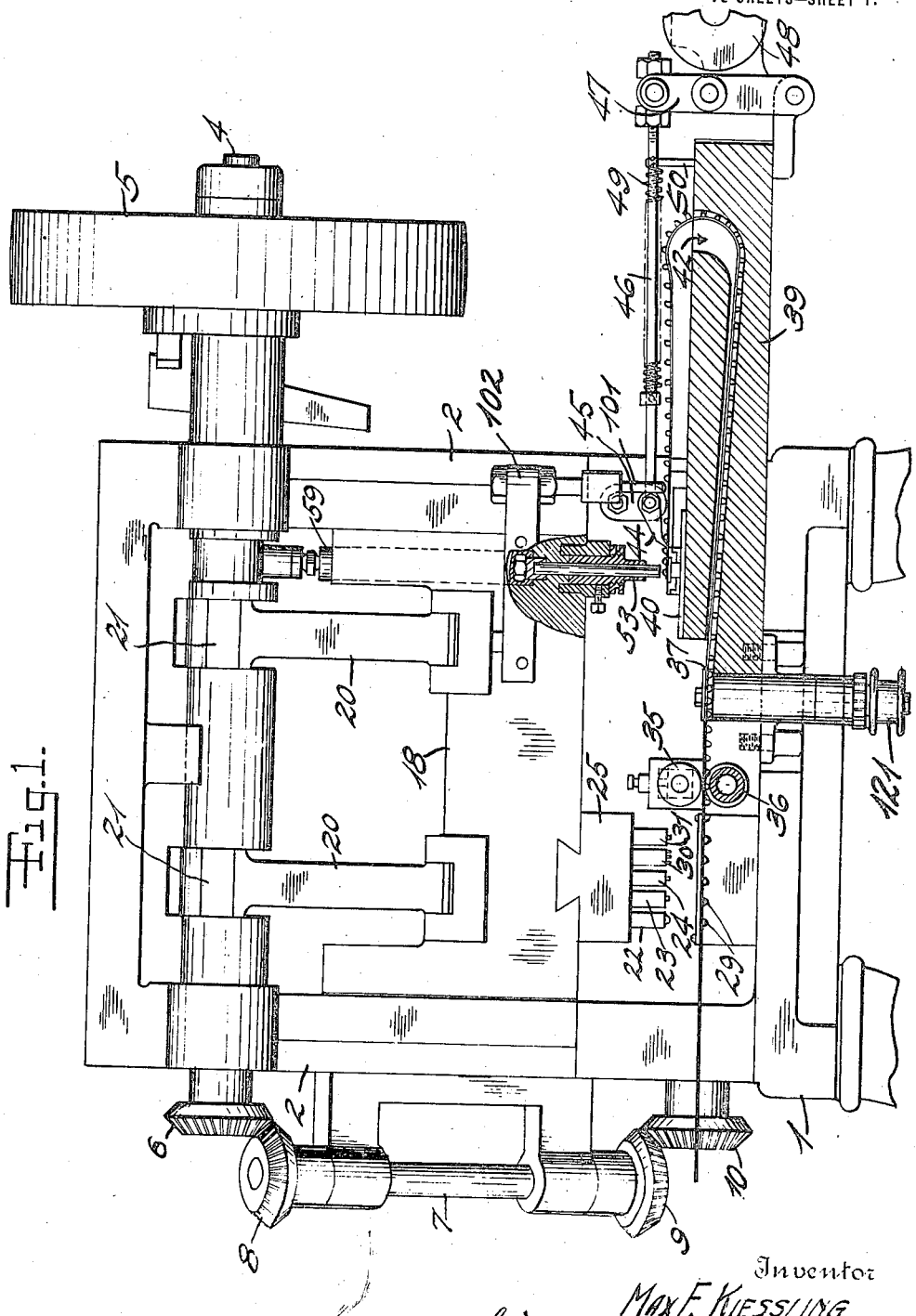
Inventor
Max F. Kiessling.
By his Attorney.
Walter A. Holden.

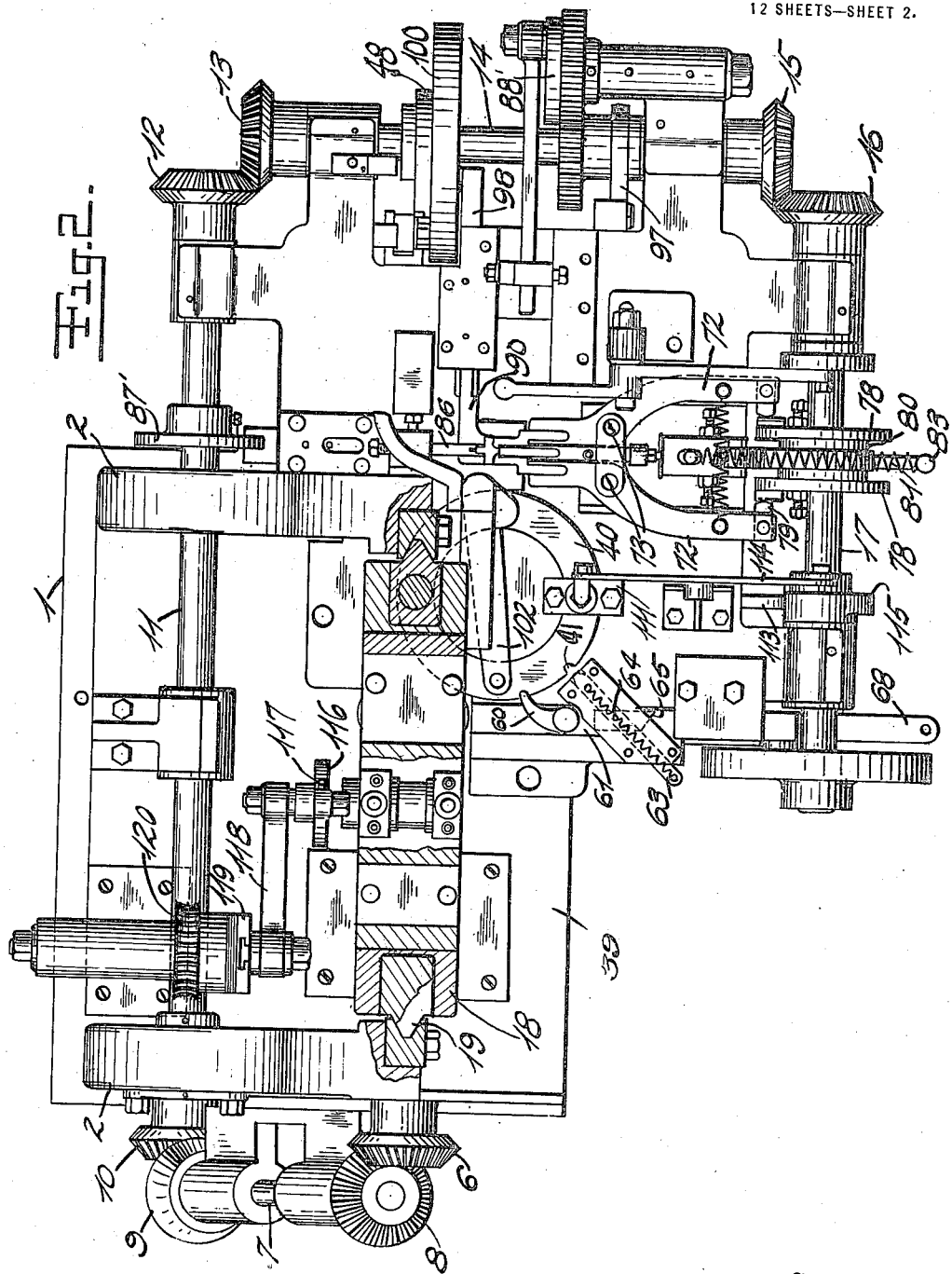

M. F. KIESSLING.
MACHINE FOR MAKING SNAP FASTENERS.
APPLICATION FILED MAR. 17, 1916.
1,326,132.
Patented Dec. 23, 1919.
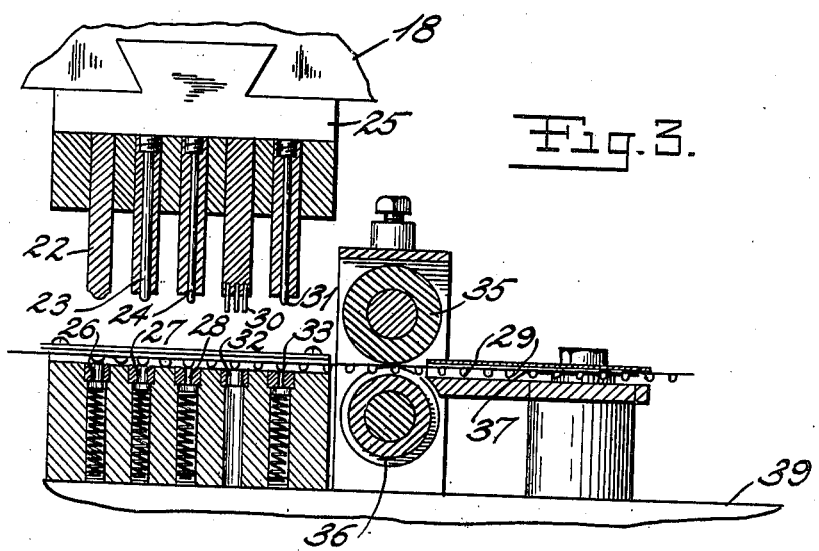
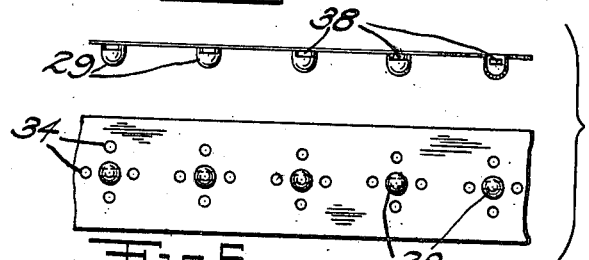
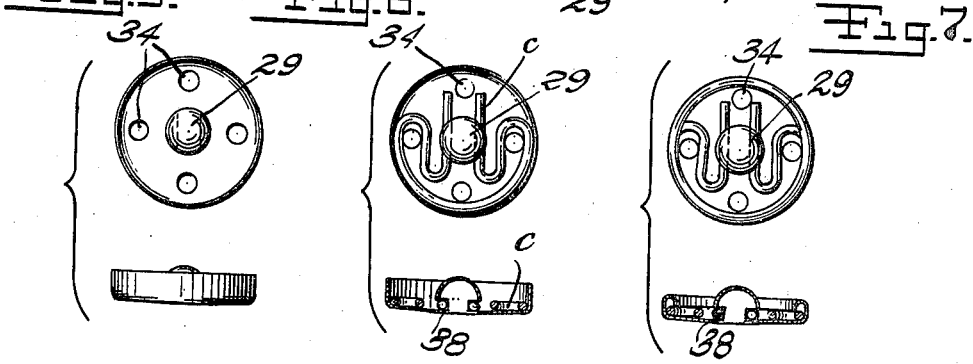
Inventor
MAX F. KIESSLING.
By his Attorney
Walter A. Holden.

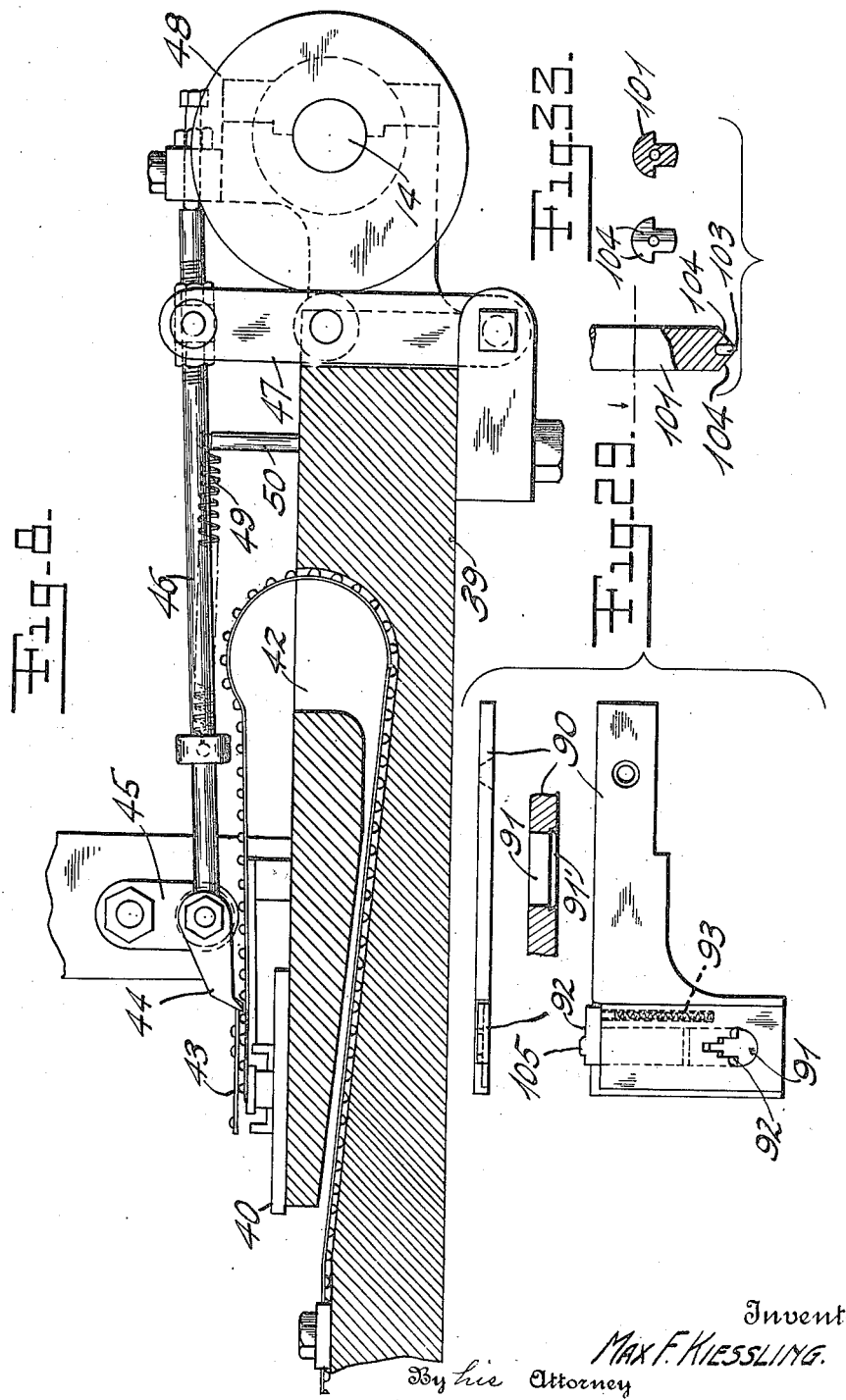

M. F. KIESSLING.
MACHINE FOR MAKING SNAP FASTENERS.
APPLICATION FILED MAR. 17, 1916.
1,326,132.
Patented Dec. 23, 1919.
12 SHEETS—SHEET 5.
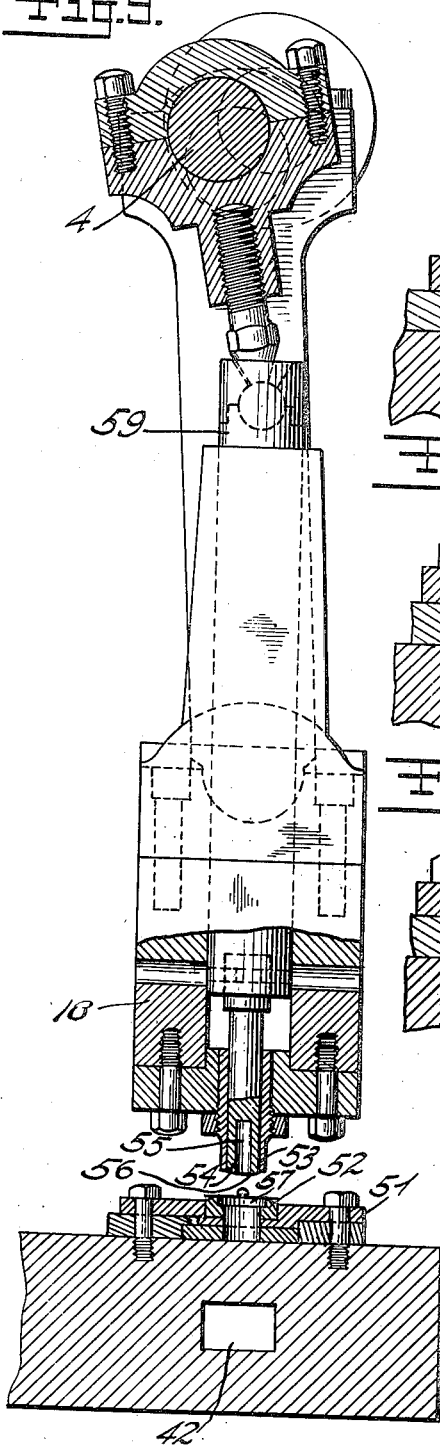
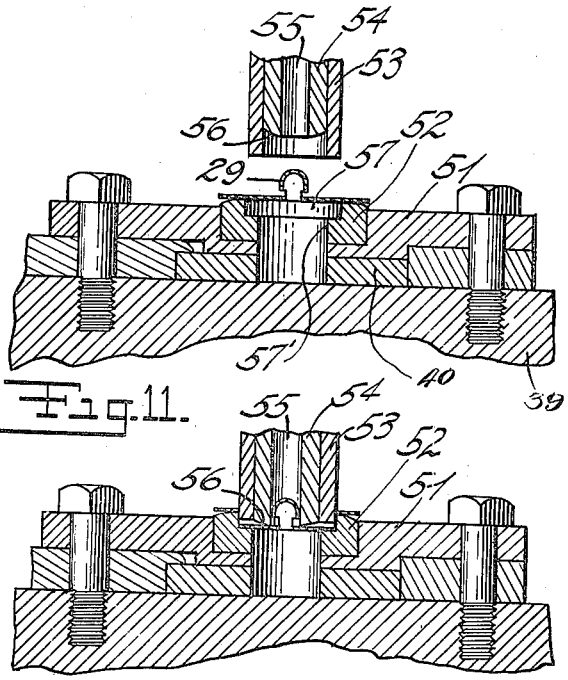
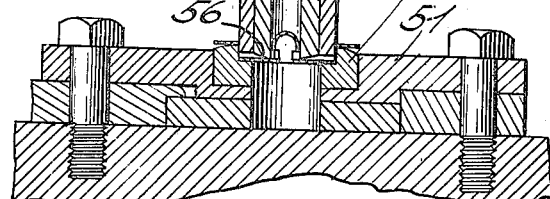
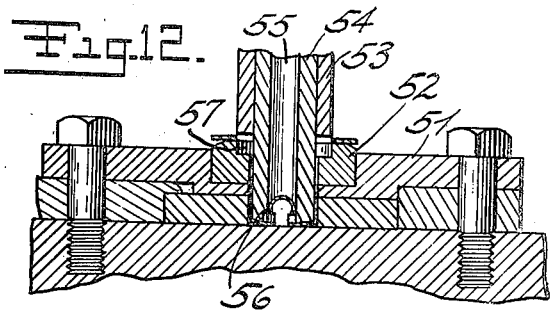
Inventor
MAX F. KIESSLING.
By his Attorney
Walter A. Holden.

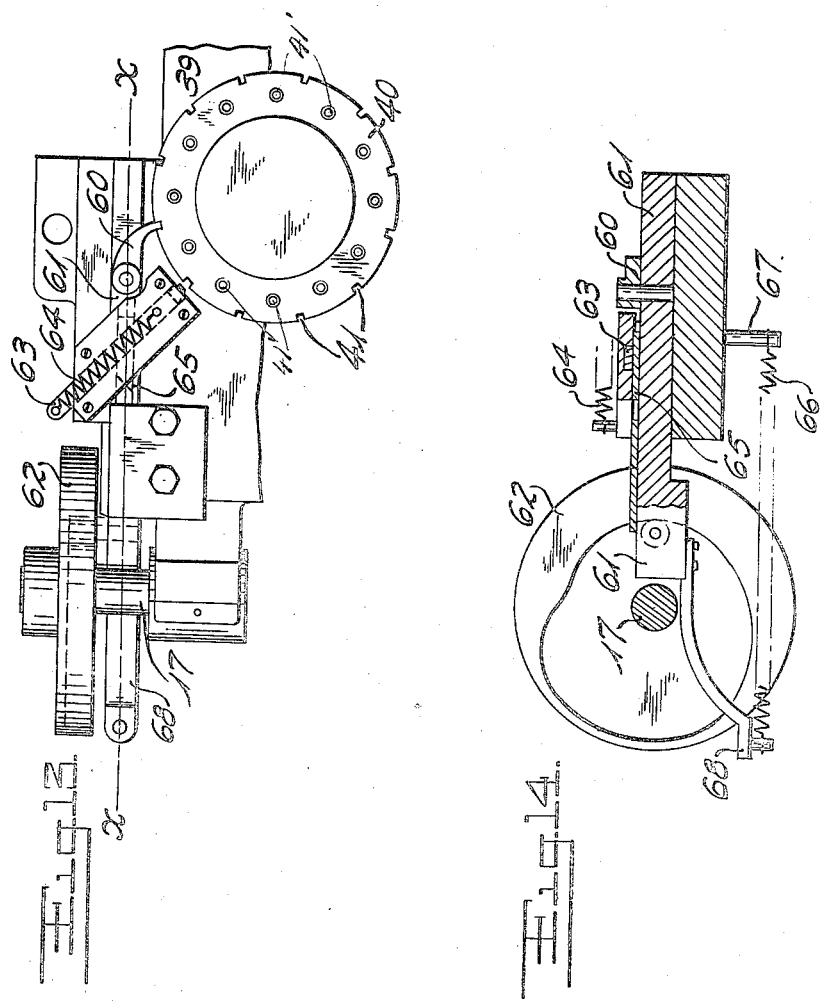

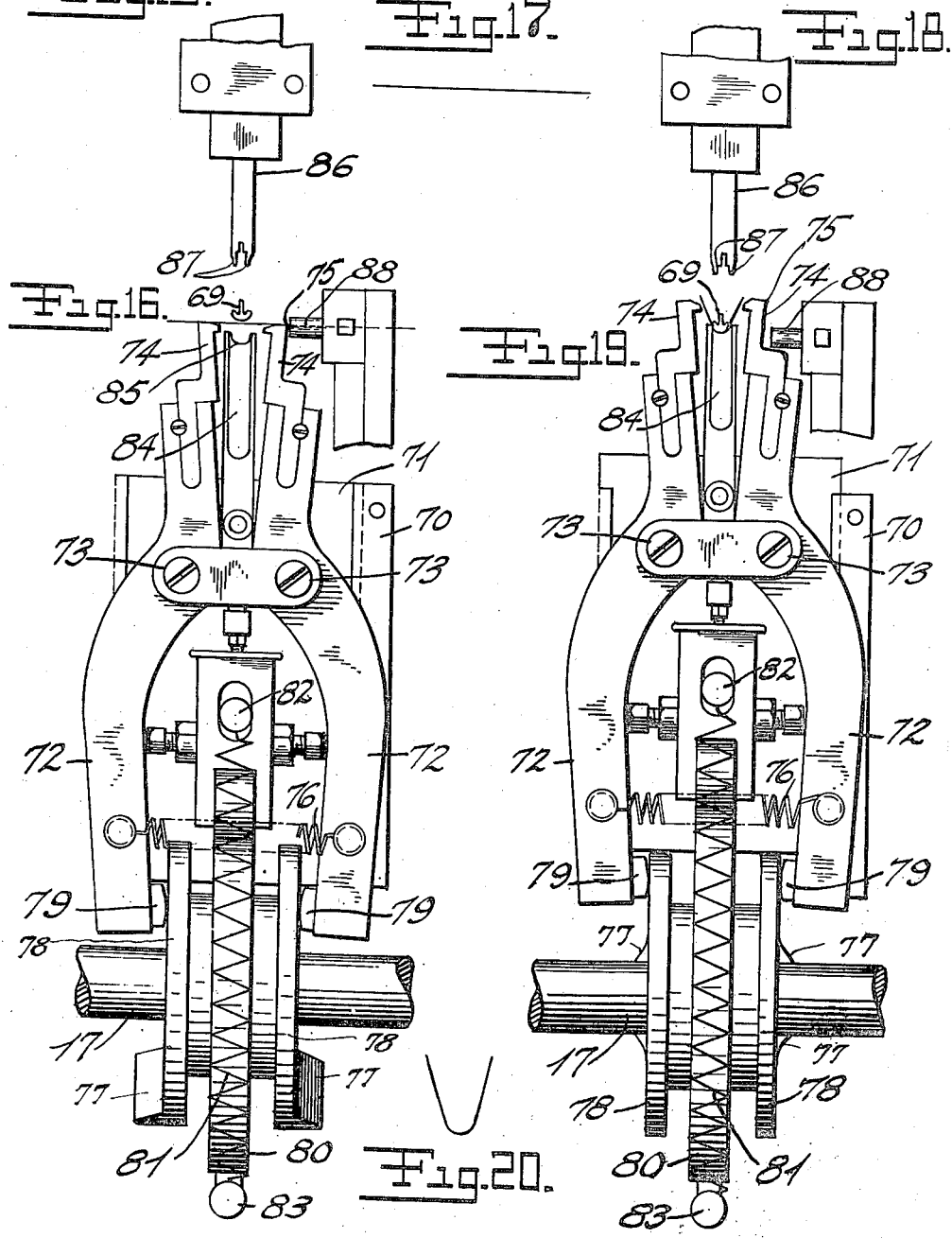

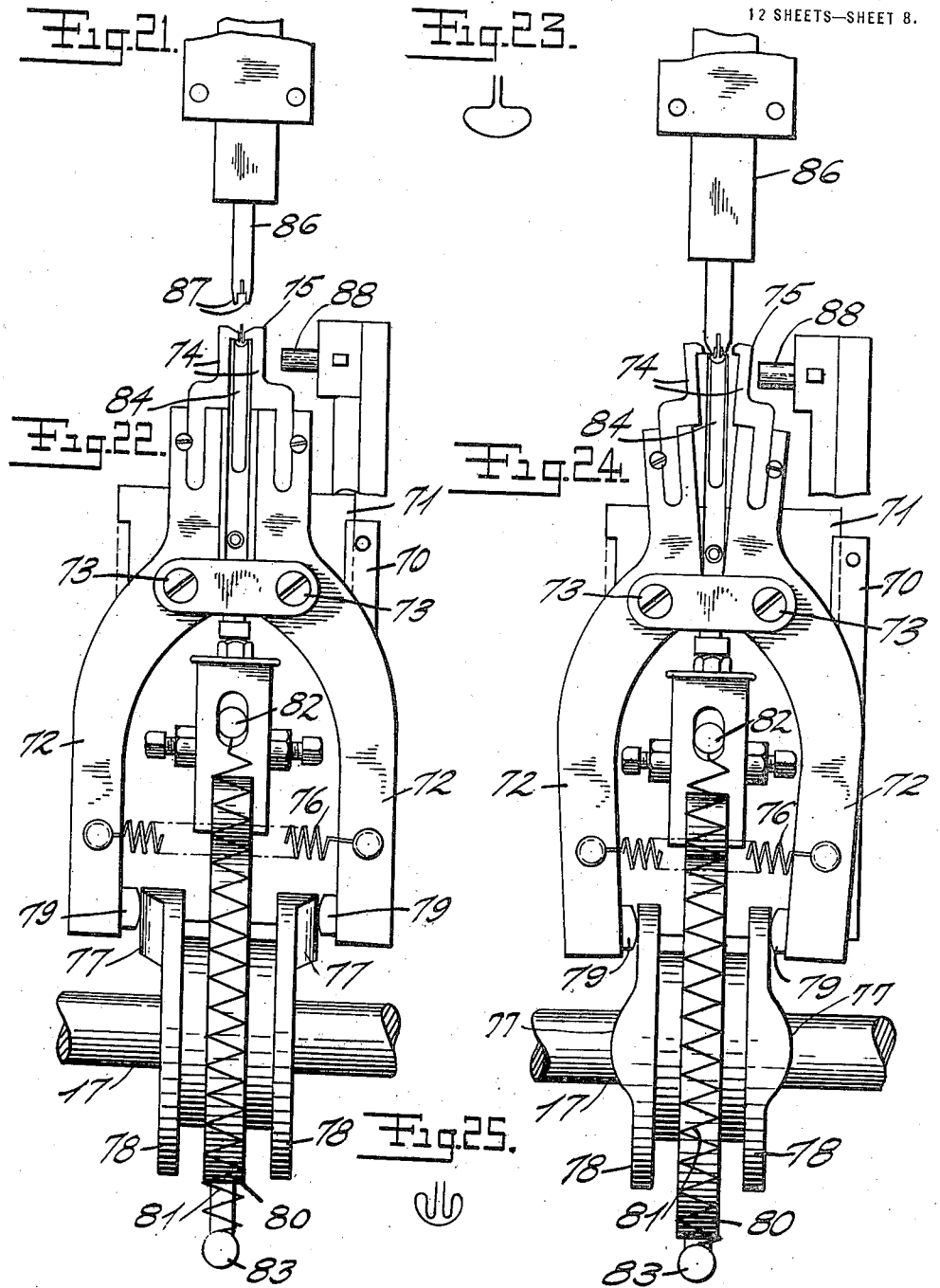

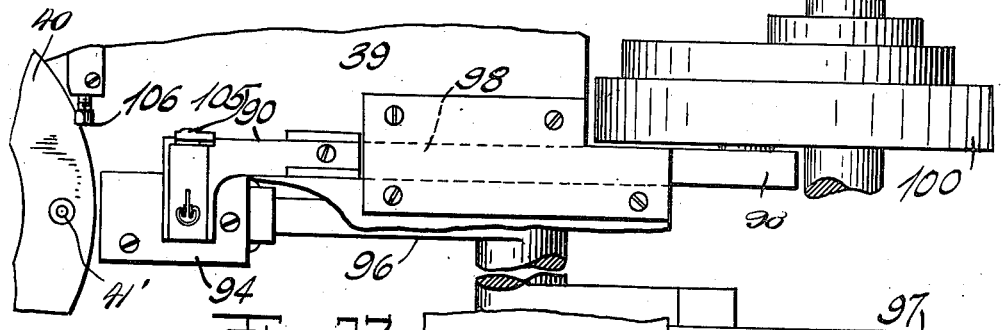
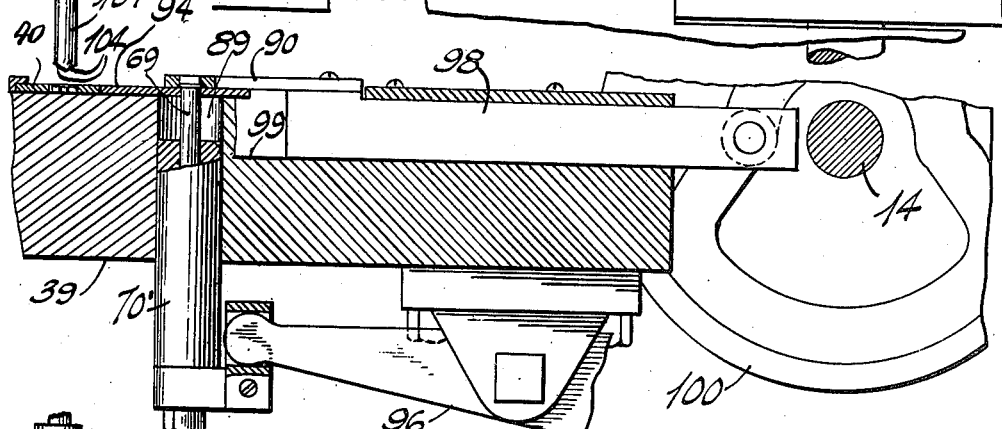
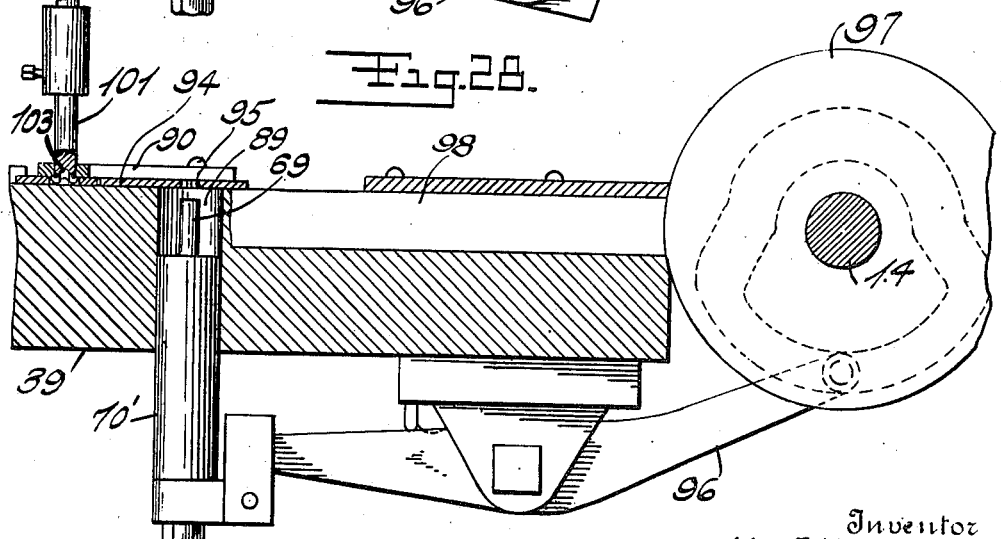

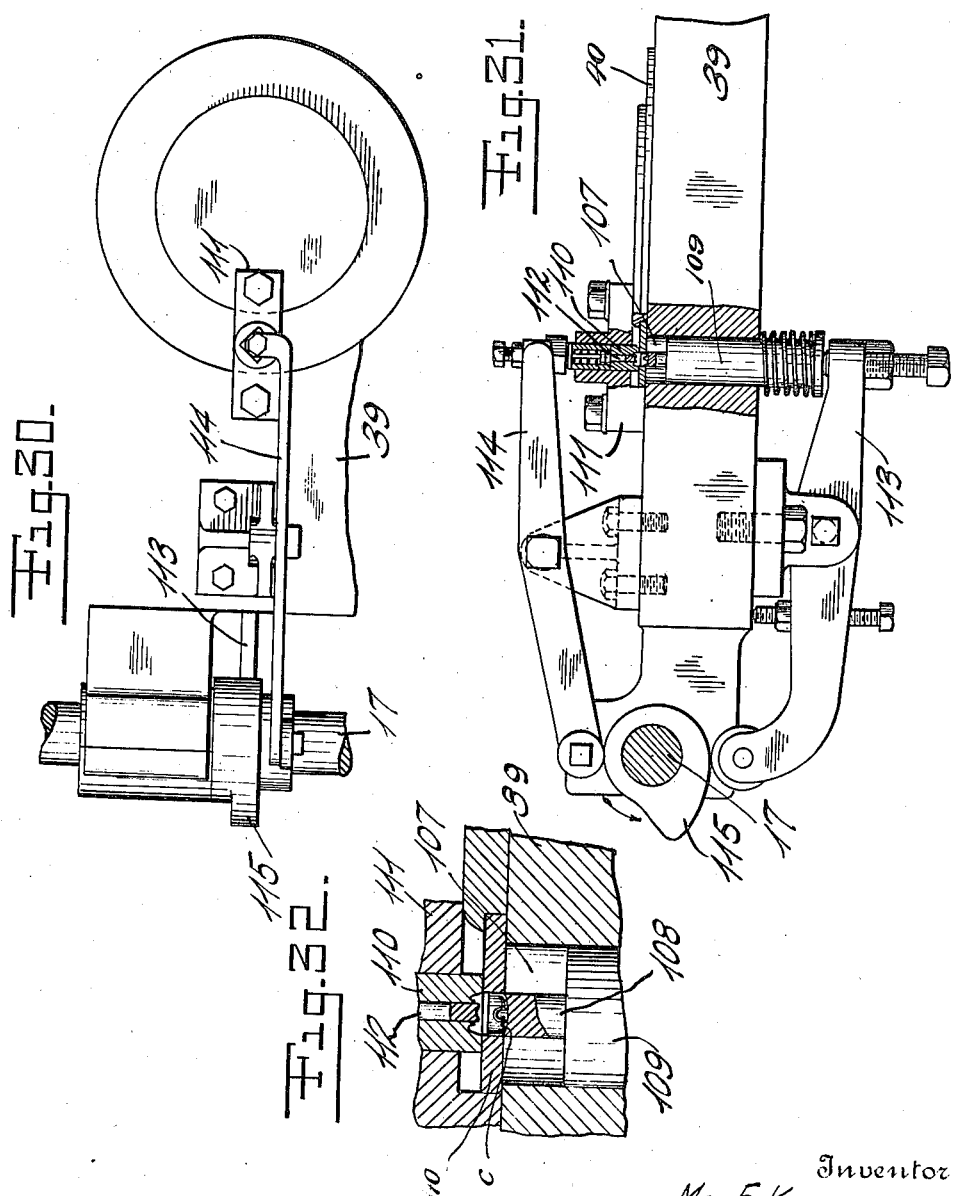

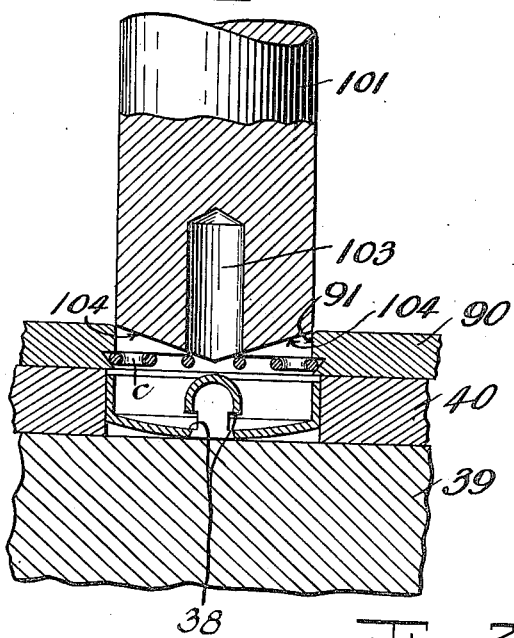
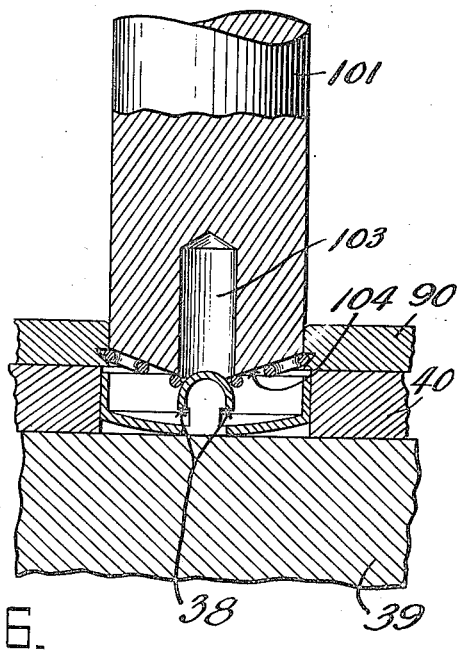
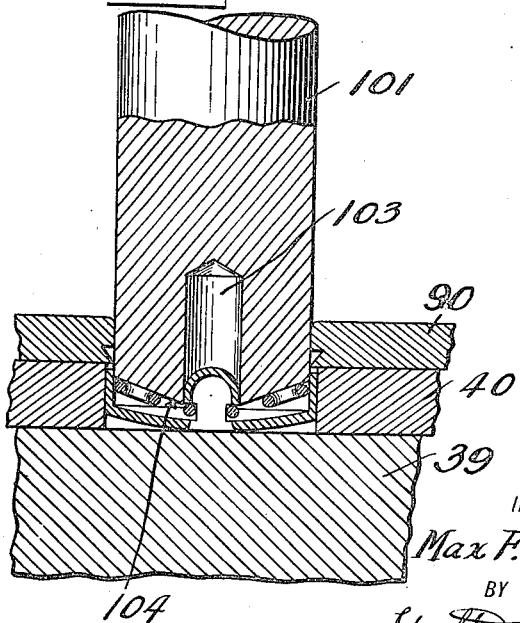

M. F. KIESSLING.
MACHINE FOR MAKING SNAP FASTENERS.
APPLICATION FILED MAR. 17, 1916.
1,326,132.
Patented Dec. 23, 1919.
12 SHEETS—SHEET 12.
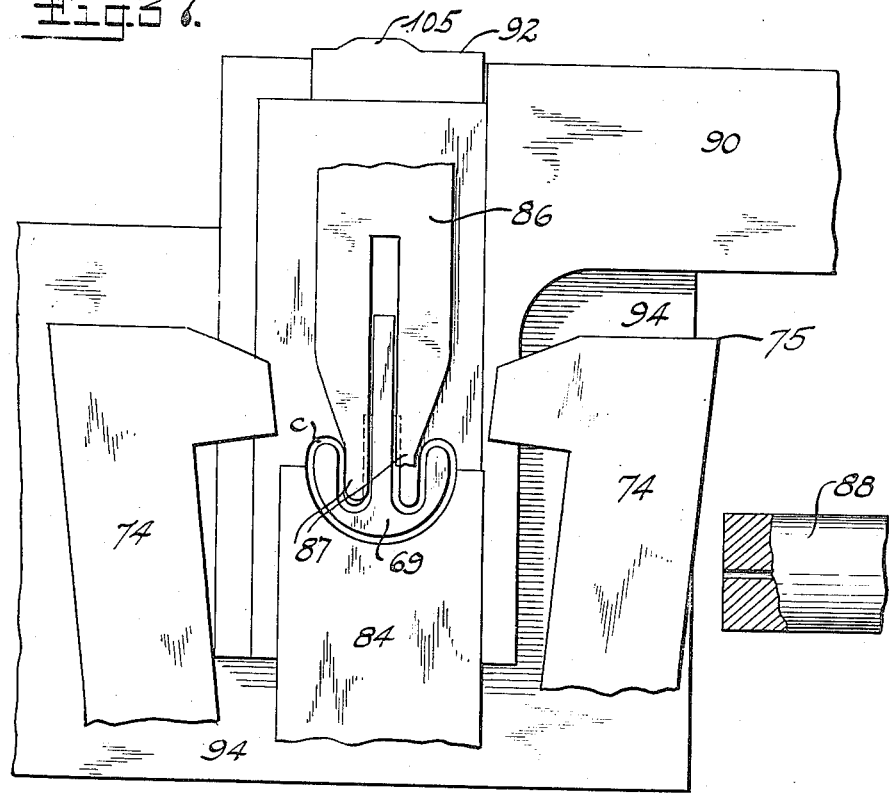
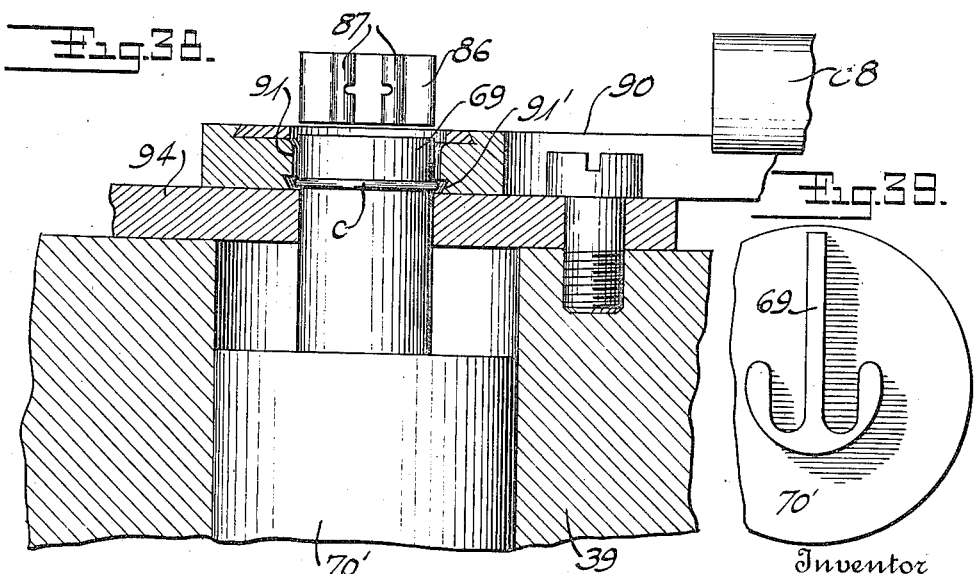
Inventor
MAX F. KIESSLING.
By his Attorney

UNITED STATES PATENT OFFICE.

MAX F. KIESSLING, OF WATERBURY, CONNECTICUT, ASSIGNOR TO THE AMERICAN FASTENER COMPANY, OF WATERBURY, CONNECTICUT, A CORPORATION OF CONNECTICUT.

MACHINE FOR MAKING SNAP-FASTENERS.

1,326,132. Specification of Letters Patent. Patented Dec. 23, 1919.

Application filed March 17, 1916. Serial No. 84,857.

*To all whom it may concern:*

Be it known that I, MAX F. KIESSLING, a citizen of the United States, residing at Waterbury, in the county of New Haven and State of Connecticut, have invented a certain new and useful Improvement in Machines for Making Snap-Fasteners, of which the following is a specification.

My invention relates to machines for making the eye members of two-part fasteners commonly known as snap fasteners. These eye members usually consist of a sheet metal plate having its central portion pressed out to form a socket, or eye proper and its edge cupped or flanged and then curled inwardly to confine a closing wire spring within the cup. A pair of legs forming a part of the spring pass through lateral slits in the socket in such position that they will closely embrace a button carried by the counterpart of the eye member to hold the button within the socket when the button is snapped between the legs of the spring after the manner customary in snap fasteners.

The principal object of my invention is to construct a machine which will embody all the instrumentalities necessary for forming the sheet metal portion of the eye member, for forming springs and for assembling the springs in the eye members, so that when the machine is in operation complete eye members will be produced by feeding to the machine a flat sheet metal strip and a coil of spring wire. A further object is to provide detail mechanism which is not only applicable to my machine but also to snap fastener machines generally.

I attain these and other objects of my invention in the mechanism set forth in the following description and accompanying drawings in which like reference characters refer to corresponding parts.

In the drawings:

Figure 1 is a front view of the main portion of my machine, a part thereof being shown in section;

Fig. 2, a top view partly in section;

Fig. 3, a detail view showing the punching and piercing mechanism;

Fig. 4, fragmentary views of the sheet metal strip after it has been pierced, punched and sawed;

Fig. 5, front and side views of the cup formed by shearing the blanks from the strip and flanging their edges;

Fig. 6, rear and sectional views of the cup after the spring has been inserted;

Fig. 7, rear and sectional views of the complete eye member;

Fig. 8, a fragmentary view showing the means for reversing and advancing the strip;

Figs. 9 to 12 inclusive, detail views showing the various operations of the punches for shearing and cupping the blanks;

Figs. 13 and 14, detail views showing the dial plate for carrying the cups between operations and the mechanism for revolving the same;

Figs. 15 to 25 inclusive, detail views of the mechanism for forming the springs;

Figs. 26 and 27, detail views of the mechanism for stripping the springs from the former and carrying the same to a position over the cups for assembling;

Fig. 28, a detail view showing the operation of removing the springs from the carrier and inserting them into the cups;

Fig. 29, enlarged views of the carrier plate;

Figs. 30 to 32 inclusive, detail views of the mechanism for curling the edges of the cups over the springs;

Fig. 33, detail view of the pusher bar;

Figs. 34 to 36 inclusive, detail views showing the different positions of the spring during the assembling operation, and Figs. 37 to 39 inclusive, detail views of the spring-forming mechanism.

The main characteristics of my machine reside in means for feeding a flat sheet metal strip to suitable punches, dies and saws to form a series of laterally slit sockets on the under side of the strip; mechanism for bending the strip back upon itself in the form of a loop so that its direction is reversed and the sockets presented on its top side; horizontally reciprocating mechanism carrying a pivoted pawl which engages the sockets and pushes the strip along to a position where it is engaged by a double punch and die which shears the metal around the sockets and flanges it upwardly forming cups; mechanism for carrying the cups which comprises a revolving ring or dial provided with a series of apertures in which the cups are seated during the assembling operations; spring-forming mechanism and means for carrying the finished springs to a position over the cups; mechanism for pushing the springs over the sockets and into the cups; mechanism for curling inwardly the edges of the cups to confine the springs therein; and means for discharging the completed eye members from the dial. It is to be understood that these main characteristics above set forth merely apply to the particular machine hereinafter described, since my invention may be embodied in such other machines as may fairly come within the scope of the claims.

I will first describe the driving mechanism which imparts motion to the several instrumentalities in the machine. Referring to Figs. 1 and 2, mounted on the bed of the machine 1 is a frame comprising uprights or brackets 2, 2. These uprights are provided near their upper extremities with suitable bearings in which is journaled the drive shaft 4 carrying a pulley 5 at one extremity and a bevel gear 6 at its opposite extremity. Mounted in suitable bearings on the side of one of the uprights 2 is an inclined shaft 7 carrying a bevel gear 8 at its upper end which meshes with the gear 6. The lower extremity of the shaft 7 carries a bevel gear 9 which meshes with a bevel gear 10 mounted on the extremity of the shaft 11 which latter is journaled in suitable bearings carried by the rearmost corners of the brackets. The opposite extremity of the shaft 11 carries a bevel gear 12 which meshes with a bevel gear 13 carried by a horizontal side shaft 14 mounted in suitable bearings carried on the side of the frame. A bevel gear 15 is carried by the opposite extremity of the shaft 14 and meshes with a bevel gear 16 which is carried by a horizontal shaft 17 mounted in suitable bearings on the front of the frame. A gate 18 is vertically reciprocated in ways, shown at 19, by the rods 20, 20 the upper extremities of which are suitably journaled on the crank shaft 21 forming a part of the drive shaft 4.

Referring to Fig. 3, a series of drawing punches 22, 23 and 24 are carried by the tool-holder 25 keyed to the under side of the gate. These drawing punches coöperate with suitable drawing dies 26, 27 and 28 respectively to form a series of socket members 29 on the under side of the sheet metal strip. A piercing punch 30 and a planishing punch 31 are also carried by the tool-holder 25 and coöperate with apertures 32, 33 to form a series of needle holes 34 in the strip around the socket member 29, as shown in Fig. 4. Feed rolls, 35, 36, which are driven from the shaft 11 by suitable mechanism for intermittently revolving the same as will hereinafter appear, are mounted beyond these punches to advance the strip between successive operations. A pair of small circular saws, one of which is shown at 37, are mounted beyond the feed rolls to cut the lateral slits 38, 38 in the sockets 29. A table 39 is secured to the bed of the machine beyond the saws and on top of this table is mounted the dial 40 which is revolved intermittently by mechanism driven by the shaft 11 as will hereinafter appear. This dial 40 is in the form of an annular ring provided with a circular series of apertures 41'. The table 39 is recessed to form a passage 42, this passage being preferably located substantially underneath the rearmost aperture in the dial. The forward extremity of the passage 42 opens upwardly through the top of the table 39 and forms a part of the guiding means for reversing the direction of the strip. A pair of strip-retaining plates, one of which is shown at 43, are mounted above and on each side of the rearmost aperture in the dial. When the strip is introduced into the machine its forward end is passed through the passage 42 and then carried upwardly and back upon itself and inserted under the retaining plates 43 so that when the strip passes over the dial, not only is its direction reversed but also the sockets 29 are presented on its top side as shown in Fig. 8. A pawl 44 which successively engages the sockets 29, is pivoted above the strip in front of the retaining plates to a rocking link 45 which latter is reciprocated by the rod 46 pivoted to a lever 47 operated by a cam 48 mounted on the shaft 14. A retractive movement is given to the rod 46 by the contracting spring 49 which connects the rod 46 with the post 50.

Referring to Figs. 9 to 12 inclusive, a plate 51 bridges the dial ring 40 over its rearmost aperture and is provided with a seat for the die 52. This die is open on its under side and registers with an aperture in the plate 51 and the rearmost aperture in the dial, thereby forming substantially one continuous passage from the lower portion of the die through the aperture in the dial. Immediately over the die 52 is a shearing punch 53 which incases a drawing punch 54, the lower extremity of the latter being provided with a central recess 55 and an upwardly tapering annular surface 56. The shearing punch 53 coöperates with the upper portion 57 of the die 52 to blank circular pieces each including a socket 29, out of the strip, as shown in Figs. 10 and 11. The drawing punch 54 coöperates with the lower portion 57' of the die 52 to flange the edge of the blank upwardly around the socket so that the blank now becomes cup-shaped, a separate view of the cup being shown in Fig. 5. The punch 54 after forming the cup pushes the same downwardly through the die and plate into the aperture in the dial as shown in Fig. 12. During this pushing operation of the punch 54 the socket 29 passes into the recess 55 in its lower extremity. The shearing punch 53 is suitably mounted in a tool-holder fastened to the under side of the gate 18. The drawing punch 54 is reciprocated by the plunger rod 59 passing through a vertical passage in the side of the gate and operated by a crank on the shaft 4.

The means for imparting the intermittent rotary movement to the dial are shown in detail in Figs. 13 and 14 in which the pivoted pawl 60 is mounted on a reciprocating slide 61 operated by the face cam 62 mounted on the shaft 17. The pawl 60 engages successively a series of notches 41 in the periphery of the dial 40 and rotates the dial a partial revolution during the forward movement of the slide 61. During the rearward movement of the slide the pawl becomes disengaged from its notch and rides rearwardly around the periphery and engages the next notch during a part of which movement the dial is held locked against rotary movement by the bolt 63 which is advanced into the notches by the contraction spring 64. While the dial is locked against rotary movement the successive operations hereinbefore described performed on the eye member take place. The slide 61 carries a cam block 65 which operates to withdraw the spring bolt during its backward movement. A contraction spring 66 having one end attached to the post 67 carried by the table and its opposite end attached to an arm 68 carried by the slide serves to advance the slide during its forward movement.

The mechanism for forming the springs $c$ which are inserted in the cups is shown in detail in Figs. 15 to 25 inclusive and in Figs. 37 to 39 inclusive. The former 69 is mounted to reciprocate through a passage in the front portion of the table 39. A slideway 70 is secured to the table in front of the former and in this slide way is mounted a slide 71. Two levers 72, 72 are journaled on pivots 73, 73 mounted on the top of the slide. Rigidly attached to the extremities of the levers are jaws 74, 74, the back of one of which presents a cutting corner edge 75. These jaws are normally held open by the contracting spring 76 having its ends connected adjacent to the rear extremities of the levers respectively. The closing movement of the jaws is effected by the projecting lugs 77, 77 mounted near the edge of the outside face portions of the revolving disks 78, 78. These lugs 77, 77 during each revolution of the disks engage the lugs 79, 79 which project inwardly from the rear extremities of the levers, thereby spreading these extremities and closing the jaws against the action of the contracting spring 76. A forward movement is imparted to the slide 71 by the cam 80 mounted on the shaft 17 between the disks 78, 78 and rigidly connected with the latter. A rearward movement is imparted to the slide 71 by a contracting spring 81 having its extremities connected respectively to a post 82 mounted on the slide and a post 83 mounted on the front of the table. A bar 84 having a curved recess 85 in its forward extremity is rigidly connected to the top of the slide 71 and projects forwardly to a point immediately in the rear of the jaws. A sliding bar 86 having its extremity provided with a pair of counter formers 87, 87 (Fig. 2) is operated by a cam 87' mounted on the shaft 11 in the rear of the machine. A guide way 88 is mounted on the table 39 immediately to one side of and in front of the former 69. The wire is intermittently fed through this guide by mechanism driven from the cam 88'. The movement of the slide 71 and the slide bar 86, taken together with the movement of the jaws, is so timed that when the forward end of the wire passes in front of the former 69, the jaws advance causing the corner edge 75 to shear the wire at the point where it leaves the guide 88, thereby forming separate lengths as shown in Fig. 17. During this advancing movement of the jaws, the bar 84 also advances and presses the wire around the back of the former 69 and brings the same to the position shown in Fig. 20. The jaws are then closed on the former 69 and bring the wire to the position shown in Fig. 23. The slide bar 86 is then also advanced on the former and brings the wire into its final form as shown in Figs. 25 and 37.

The mechanism for carrying the springs to the cups in the dial and for fixing them in the cups is shown in detail in Figs. 26 to 29 inclusive and in Figs. 33 to 39 inclusive. The former 69 is mounted on a plunger 70' which fits the passage 89 in the table 39, into which passage the former is lowered after the spring has been formed thereon as shown in Fig. 28, so that the top of the former will not interfere with the movement of the carrier plate 90. This carrier plate is provided with an aperture 91 having its side wall recessed to form a seat 91' for the outside circular part of the spring. This aperture 91 is of the same contour as that of the former but slightly larger and during the operation of forming the spring the former 69 projects upwardly through this aperture. A setting slide 92 is mounted in a passage in the carrier plate so that its inner extremity may enter the aperture 91. This slide is held in its normal position by the expansion spring 93, as shown in Fig. 29. Between the top of the table and the slide is a stripper plate 94 provided with an aperture 95 through which the former 69 projects when the spring is being formed thereon. The edges of this aperture 95 slightly overlap those of the aperture 91 so that when the former 69 is drawn downwardly below the surface of the table 39 into the passage 89 it carries the spring c into the aperture 91 of the carrier plate 90 causing the edges of the stripper plate 94 to engage the spring and prevent the same from following the former into the passage 89 as shown in Fig. 38. The raising and lowering of the former 69 is effected by a lever 96 connected to its enlarged portion 70' and operated by a face cam 97 mounted on the shaft 14. The carrier plate 90 is rigidly mounted on the forward extremity of the slide 98 which reciprocates in a channel 99 in the side of the table. Reciprocating movement is imparted to the slide 98 by the face cam 100 mounted on the shaft 14 so that when the slide is advanced it moves the carrier plate 90 to a position where the aperture 91, which carries the spring, is immediately over the aperture in the right-hand side of the dial plate which aperture carries a sheet metal cup. While the carrier plate 90 is advancing a lug 105 engages an adjustable lug 106 mounted on the table 39 and causes the inner extremity of the slide to advance slightly into the aperture 91 and set the spring. Immediately above this aperture in the dial is a reciprocating pusher bar 101 which is operated by an arm 102 (Fig. 1) rigidly attached to the front of the gate 18. This pusher bar is provided in its end with a socket-receiving recess 103 and tapering surfaces 104, 104 and in its downward movement passes through the aperture 91 in the carrier plate into the aperture in the dial plate as shown in Figs. 34, 35 and 36. As the pusher bar passes through the aperture 91 in the carrier plate its tapering surfaces 104, 104 engage the legs of the spring and carrying them downwardly spreads them over the upper portion of the socket 29. This causes the outer curved portion of the spring to be drawn out of its seat 91' and to become engaged by the tapering surfaces 104, 104, as shown in Fig. 35. The pusher bar then carries the entire spring into the cup where its legs snap into the side slits 38, 38 of the socket as shown in Fig. 36.

The mechanism for curling in the edges of the cup over the top of the spring is shown in Figs. 30 to 32 inclusive in which the front of the table 39 is provided with a passage 107 for the spring-seated plunger 108 having its lower end 109 enlarged to fit said passage. The plunger 108 registers with the aperture in the front of the dial so that it may pass through the same. Mounted over this aperture in the dial is a curling die 110 seated in the die block 111. The die 110 incases the spring-seated plunger 112. Both the plungers 108 and 112 are successively operated by the levers 113, 114 operated by a cam 115 on the shaft 17. The plunger 108 when lifted by the lever 113 raises the cup out of the aperture in the dial so that the edge of the cup will engage the die and be curled over on top of the spring, as shown in Fig. 7, thereby completing the eye member. After this operation the plunger 108 recedes and the spring-seated rod 112 is pushed downwardly by the lever 114 and forces the cup back again into the aperture in the dial.

The feed rolls 35 and 36 are mounted to be operated from a shaft (not shown) which shaft carries a ratchet 116 driven by a pawl 117. This pawl 117 is reciprocated through a connecting rod 118 by the cam 119 which latter is driven by a worm wheel and a worm the former being shown at 120 and the latter (not shown) being mounted on the shaft 11.

The operation of the machine is as follows: The machine is started and the cupping punches 22, 23, 24 co-act with their dies to draw the socket 29 into its final shape. The strip having the sockets formed on its under side passes through the feed rolls 35, 36 the lower feed roll 36, being channeled to permit the passage of the sockets. The strip now advances beyond the feed rolls between the circular saws 37 which latter cut the lateral slits 38 therein. The direction of the strip is then reversed as it advances through the passage 42 and under the retaining plates 43, 43 so that the sockets project from its top side. Just before the first socket passes under the retaining plates the pivoted pawl rides over its top portion and engages its rear side so that the reciprocating motion given to the pawl pushes the socket forwardly. The pawl likewise rides over each socket in the series formed in the strip and intermittently advances the same between the successive operations on the strip. When the sockets come over the die 52 the strip is blanked around the socket by the plunger 53 and the blank so formed is cupped by the plunger 54 coöperating with its die 52 in the manner hereinbefore described. The strip thus provided with the apertures formed by shearing the blank passes onwardly and out of the machine in any desired manner forming scrap. The cup now being left in the rearmost aperture in the dial is carried around under the pusher bar 101 by the action of the reciprocating pawl 60, shown in Fig. 13, engaging the notches 41 and rotating the dial until the cups are brought beneath the aperture 91 in the carrier plate 90 in which aperture the spring is seated, the wall of the aperture being provided with a groove or recess 91' for this purpose. The pusher bar 101 then descends through the aperture 91 and inserts the spring into the cup. The dial is then rotated by the action of the pawl 60 until the assembled spring and cup are brought to the front of the plate where its edges are curled over on top of the spring by the coöperation of the lifting plunger 108 and die 110. Then the dial is turned until the completed eye-member is brought to the left-hand side of the plate where it may be discharged from the dial by pushing the same through a registering aperture (not shown) in the table 39, or by any other suitable mechanism. The apertures in the dial plate are substantially of the same diameter as the cups so that the latter will rest therein by a slight frictional contact. This is a very important feature of my invention since this frictional contact serves to strip the cup from the drawing punch 54 after the same has pushed the cup into its aperture, and further it prevents the cup from moving in its seat which movement would tend to bring the lateral slits in the sockets out of alinement with the legs of the spring during the assembling operation and thereby prevent the legs from snapping into the slits. The depth of the seats makes it possible for the conveyer to move the cups to a position immediately under assembling tools or to slide the carrier plate for the springs immediately over the top of the conveyer since the wall of the cup is entirely within the seat, thereby in no way interfering with any elements under which the conveyer travels. This is a very important feature of the invention since in some machines disclosed in the prior art it is necessary to advance the springs toward the face of the conveyer instead of in planes parallel with the conveyer because the edge of the cup projects above the top of the conveyer. While an endless conveyer of the rotary type as described possesses inherent advantages, yet the broad features of the invention comprehend any suitable conveying device which operates to move the cups in the manner hereinafter claimed. Another important feature of my invention resides in forming a recess 91' in the wall of the aperture 91 of the carrier plate since this recess not only prevents the spring from flying out of the aperture but also enables it to be picked up by the pusher bar during the assembling operation. It should be observed that by making the lower end of the pusher bar wedge-shaped and providing it with a socket-receiving recess I am enabled to push the spring into the cup directly from the aperture in the carrier plate without employing any intermediate spreading means. It should be further observed that I am enabled by my machine to operate on both sides of the sheet metal strip, which would be difficult should the direction of the latter not be reversed in its passage through the machine, and further the strip is intermittently advanced by feed rolls so it can be operated upon by one group of punches while it is traveling in its initial direction and is again intermittently advanced by the reciprocating pawl so that it can be operated upon by another group of punches while it is traveling in its final direction, thereby making the timing of the machine less difficult since the bend in the strip may be regarded as being slack while the machine is in operation. Since the feed rolls and the reciprocating pawl operate independently of each other to advance the strip as above described it is possible to form the sockets in a separate machine and in the first instance to feed the socketed strip under the retaining plates 43 directly to the cupping tools by either removing the socketing tools or letting the socketing mechanism run idle. The utilization of an oscillating feeding device for advancing the socketed strip to the blanking mechanism tends to position the sockets accurately underneath the blanking punches, which is a very important feature in forming socketed blanks. The application also of a feeding device to the blanking strip immediately in front of the blanking tools is also an important feature when cupping socketed blanks since it renders the control of the strip more positive when the machine is running at high speed. Further, the feature of employing a feeding device which engages the sockets tends to prevent any slipping of the strip during the feeding operation, which is liable to occur between the feed rolls located at a distance beyond the blanking tools as is sometimes customary in machines disclosed in the prior art. It is obvious that the socket-forming mechanism may be entirely eliminated from the machine if desired and the sockets formed in the strip in a known machine. It should be noted also that the arrangement of the driving shafts which impart motion to the various instrumentalities forming the eye member is such that the machine requires a relatively small bed plate. As hereinbefore pointed out, it is not necessary that the various mechanisms which go to make up the invention should be embodied in the particular machine herein disclosed since they may be embodied in snap fastener machines generally wherever applicable. Further, it is not necessary that all the features of the present invention should be used together since, so far as comprehended within the scope of the appended claims, each feature may be used separately or combined with known features of existing machines, the machine herein disclosed being an example of only one type of automatic machine which embodies all the various features of the present invention. Besides the advantages above mentioned the invention possesses numerous other inherent advantages which are made manifest as the invention is applied.

Having now described my invention what I claim and desire to protect by Letters Patent is:

1. In a snap fastener machine, a carrier plate having a spring-receiving aperture, the said plate being provided with a setting slide arranged to enter said aperture.

2. In a snap fastener machine, a carrier plate provided with a spring-receiving aperture and a setting slide arranged to enter said aperture, the said aperture having its inside wall recessed to form a spring-receiving seat.

3. In a machine for effecting the insertion of the springs in snap fasteners, a V-shaped wedge having its apex portion provided with a socket receiving recess.

4. In a snap fastener machine, the combination with a plunger, of a plate having a spring-holding aperture underneath said plunger and a cup-carrying dial provided with seats one of which is underneath said aperture, the lower extremity of said plunger having inclined surfaces forming a wedge and the said wedge being provided with a socket-receiving recess.

5. In a snap fastener machine, wire forming mechanism comprising a former, a pair of jaws arranged to coöperate therewith, one of said jaws having a wire shearing edge, a pair of pivoted levers carrying said jaws, a reciprocating slide on which said levers are mounted, and a guide for the wire having its inner extremity in longitudinal alinement with said edge when the jaws are open.

6. In a machine for making snap fasteners, a support for the socket members, means for holding the springs in a position facing the socket members, in which position the inside members of the springs are spaced apart a distance less than the width of the sockets, and reciprocating mechanism for pushing the springs bodily out of the said spring-holding means into the socket members, the said reciprocating mechanism being provided with guiding surfaces arranged to enter between and to separate the inside members of the spring during said pushing operation.

7. In a machine for making snap fasteners, means for supporting the socket members, means for holding the springs in a position facing the socket members, and reciprocating mechanism for effecting the insertion of the springs in the socket members comprehending a spreading device mounted independently of said spring-holding means, the support for the socket members being arranged to hold said members in a fixed relation to the reciprocating mechanism during the inserting operation.

8. In a machine for making snap fasteners, means for supporting the socket members, means for holding the springs in a position facing the socket members, and reciprocating mechanism for inserting the springs into the socket members, the said reciprocating mechanism being arranged to coöperate with the head of the socket for separating the inside members of the springs, and the said support for the socket members being arranged to hold said members in a fixed relation to said reciprocating mechanism during the inserting operation.

9. In a machine for making the eye members of snap fasteners, conveying means for supporting socketed cups, spring-forming instrumentalities, mechanism which operates in a different plane from said spring forming instrumentalities for moving the springs to a position in alinement with the cups while the latter are supported by the conveying means, and means for bringing the cups and springs together so that the springs are contained in the cups.

10. In a machine for making the eye members of snap fasteners assembling instrumentalities for bringing together springs formed with separable portions and socketed cups so that the springs are contained in the cups, conveying means for moving the cups into alinement with the assembling instrumentalities, and conveying means for moving the springs into alinement with the assembling instrumentalities, the said assembling instrumentalities comprehending a movable device which operates by its movement to spread the separable members of the springs and the said conveying means for the cups being arranged to remain in their operative relation in alinement with the assembling instrumentalities until the springs are contained in the cups.

11. In a machine for making the eye members of snap fasteners, conveying means for supporting socketed cups, instrumentalities for forming springs having separable members and conveying them to a position in alinement with the cups while the latter are supported by said conveying means and mechanism for bringing together the springs and cups so that the springs are contained in the cups, the said mechanism comprising a spreading device which operates by its movement to spread the separable portions of the springs.

12. In a snap fastener machine, the combination with a carrier plate provided with a spring-receiving aperture, of a stripper plate located under said carrier plate, a former arranged to reciprocate through said plates, spring-forming instrumentalities arranged to coöperate with said former above said carrier plate and mechanism for lowering said former to a position below said carrier plate, whereby the spring may be stripped from the former and left in the aperture in the carrier plate.

13. In a snap fastener machine, the combination with a carrier provided with a spring-holding aperture, of a former arranged to reciprocate through said carrier, spring-forming instrumentalities arranged to coöperate with said former above said carrier, mechanism for drawing said former downwardly below the carrier and means for stripping the spring from the former and seating the same in the carrier.

14. In a snap fastener machine, a carrier plate provided with a spring-receiving aperture, a setting slide arranged to enter said aperture and a spring for withdrawing said slide from said aperture.

15. In a machine for making snap fasteners, a support for the socket members, means for holding the springs in a position facing the socket members, in which position the inside members of the springs are spaced apart a distance less than the width of the sockets, and reciprocating mechanism for inserting the springs into the socket members, the said reciprocating mechanism being provided with bearing surfaces which engage both the outside and inside members of the springs and spread the latter over the sockets during the inserting operation.

16. In a machine for making the eye members of snap fasteners, the combination with mechanism for forming a series of open-sided sockets in a sheet metal strip, mechanism for blanking the metal around said sockets, means for intermittently advancing said strip to said socket-forming mechanism, means for turning over said strip and intermittently advancing the same to said blanking mechanism, a holder for springs and assembling means for fixing said springs in said blanks.

17. In a machine for making the eye members of snap fasteners, the combination with mechanism for forming a series of open-sided sockets in a sheet metal strip, means for blanking the metal around said sockets, means for intermittently advancing said strip to said socket-forming mechanism, means for turning over said strip and intermittently advancing the same to said blanking mechanism, spring-forming mechanism and assembling means for fixing the springs in said blanks.

18. In a machine for making the eye members of snap fasteners, a dial plate for carrying the eye members between operations, mechanism for advancing a sheet metal strip in one direction below the dial plate and in the opposite direction above the dial plate, socket-forming mechanism arranged to operate on said strip while advancing in the first mentioned direction, blanking mechanism arranged to operate on said strip while advancing in the last mentioned direction, a holder for springs and assembling means for fixing the springs in said blanks.

19. In a machine for making the eye members of snap fasteners, a conveyer for carrying the eye members between operations, a guiding passage below said conveyer, mechanism for intermittently advancing a sheet metal strip in one direction through said passage and in the opposite direction above said conveyer, socket-forming mechanism arranged to operate on said strip while advancing in the first mentioned direction, blanking mechanism arranged to operate on said strip while advancing in the last mentioned direction, a holder for springs and assembling means for fixing the springs in said blanks.

20. In a machine for making the eye members of snap fasteners, means for supporting the socketed cups, mechanism for forming the completed springs, separate means for conveying the springs away from said spring-forming mechanism to a position for delivery to the cups in which position the inside members of the springs are spaced apart a distance less than the width of the socketed portions of the cups, and instrumentalities mounted independently of said conveying means for positioning the springs in the cups.

21. In a machine for making snap fasteners, means for supporting a socketed cup, means for supporting a spring in front of said cup in a position in which its inside members are spaced apart a distance less than the width of the socketed portion of the cup, and instrumentalities for pushing the spring bodily out of said spring-supporting means into the cup comprehending a plunger having its extremity provided with a socket which surrounds the socketed portion of the cup at the end of its advancing movement.

22. In a machine for making snap fasteners, means for supporting a socketed cup, means for supporting a spring in front of said cup in a position in which its inside members are spaced apart a distance less than the width of the socketed portion of the cup, and instrumentalities for positioning the spring in the cup comprehending an abutting device which coöperates with the head of the socketed portion of the cup to spread the inside members of the spring during said positioning operation.

23. In a machine for making snap fasteners, means for supporting a socketed cup, means for supporting a spring in front of said cup in a position in which its inside members are spaced apart a distance less than the width of the socketed portion of the cup, and reciprocating instrumentalities for positioning the spring in the cup comprehending a socketed V-shaped wedge arranged to coöperate with the socketed portion of the cup to separate the inside members of the spring during the positioning operation.

24. In a machine for making the eye members of snap fasteners, a conveying device comprehending a slide having a recess the wall of which is provided with a seat for receiving the peripheral portion of a spring, the said seat being shaped to facilitate the disengagement of the spring when the latter is subjected to a pushing force through said recess.

25. In a machine for making the eye members of snap fasteners, a dial having a cup-holding seat, spring-inserting mechanism and mechanism for curling inwardly the edges of the cups, the said dial being movable to bring said seat successively into operative relation to said spring-inserting mechanism and into operative relation to said mechanism for turning in the edges of the cups.

26. In a machine for making the eye members of snap fasteners, assembling instrumentalities for bringing together springs formed with separable portions and cups formed with laterally slit socketed portions so that the springs are contained in the cups, in combination with conveying means for delivering said springs and cups to said assembling instrumentalities and holding them in alinement with each other preparatory to the assembling operation in which position no part of the assembling instrumentalities is interposed between them.

27. In a machine for making the eye members of snap fasteners, assembling instrumentalities for bringing together springs formed with separable portions and cups formed with laterally slit socketed portions so that the springs are contained in the cups, in combination with sliding mechanism which operates by rectilinear motion for delivering the springs to said assembling instrumentalities in a position in which their separable portions are alined with the slits in the socketed portions of the cups preparatory to the assembling operation and no part of the assembling instrumentalities are interposed between the springs and cups.

28. In a machine for making snap fasteners, means for holding the socketed cups, means for holding springs formed with inside members in front of the cups in a position in which their inside members are spaced apart a distance less than the width of the socketed portion of the cups, and reciprocating mechanism arranged to engage and impart a bodily movement to the springs, whereby the same are forced into the cups, the said reciprocating mechanism being the sole means for engaging the inside members of said springs during the inserting operation.

29. In a machine for making snap fasteners, means for holding the socketed cups, means for holding springs formed with inside members in front of the cups in a position in which their inside members are spaced apart a distance less than the width of the socketed portions of the cups, and mechanism which operates in a direction toward the open side of the cups for imparting a bodily movement to the springs, the said mechanism being arranged to enter the cups on all four sides of the socket whereby the inside members of the springs are positioned in the sockets.

30. In a machine for making snap fasteners, means for holding the socketed cups, means for holding springs formed with inside members in front of the cups in a position in which their inside members are spaced apart a distance less than the width of the socketed portions of the cups, and reciprocating mechanism separate from said spring-holding means for positioning the springs in the cups, the said mechanism being provided with a spreader arranged to separate the inside members of the springs during the positioning operation.

31. In a machine for making the eye members of snap fasteners, means for supporting a socketed cup, means for supporting a spring formed with inside members and mechanism for assembling the spring and cup so that the spring is contained in the cup, both of said means for supporting the spring and cup being movable in adjacent parallel planes from positions remote from each other to positions contiguous to each other in which latter positions no part of the assembling mechanism is interposed between them and the spring is held immediately in front of the cup preparatory to assembling the spring and cup.

32. In a machine for making the eye members of snap fasteners, means for supporting socketed cups, mechanism for forming springs and conveying them to a position in alinement with the cups in which position the inside members of the springs are spaced apart a distance less than the width of the socketed portions of the cups and reciprocating mechanism for pushing the springs out of said conveying means and positioning them in the cups.

33. In a machine for making the eye members of snap fasteners of the kind in which closing springs operate in laterally slit socketed portions of cups, instrumentalities for assembling said springs and cups including a die for turning the edges of the cups over the contained springs, in combination with a conveying device provided with a cup-holding seat, the said conveying device being movable to bring the cup into operative relation to said assembling instrumentalities which latter include means for forcing the cups out of the seat into immediate engagement with the die to complete the assembling operation.

34. In a machine for making eye members of snap fasteners including springs and socketed cups, conveying means provided with a non-rotatable seat for holding the socketed cups, conveying means for receiving the springs after they have been bent to their final shape and moving them successively to a position in alinement with the open side of the cups, in which position the inside members of the springs are spaced apart a distance less than the width of the socketed portions of the cups, and instrumentalities which are movable relatively to said cup-conveying and spring-conveying means for bringing the springs and cups together so that the springs are contained in the cups, the said instrumentalities operating by said movement to spread the inside members of the springs.

35. In a machine for making the eye members of snap fasteners, instrumentalities for assembling springs formed with inside members and cups formed with laterally slit socketed portions so that the springs are contained in the cups with their inside members sprung into the slits in the socketed portions, mechanism for receiving the completed springs and delivering the springs to said assembling instrumentalities, and means provided with a non-rotatable cup-holding seat which are movable to present the cups to said assembling instrumentalities in a position in which the slits in the sockets are alined with the inside members of the springs.

36. In a machine for making the eye members of snap fasteners, laterally movable means provided with a non-rotatable seat for supporting socketed cups, conveying means for receiving springs which have been bent to their final shape and moving them successively to a position in alinement with the open sides of the cups in which position the inside members of the springs are spaced apart a distance less than the width of the socketed portions of the cups, and instrumentalities for bringing the cups and springs together so that the springs are contained in the cups.

37. In a machine for making the eye members of snap fasteners, instrumentalities for turning the edge of a cup over a contained spring comprehending an alined plunger and die and a conveyer provided with a non-rotatable cup-holding seat, the said conveyer being movable to present the cup in front of the plunger and facing the die, whereby the cup may be forced by the plunger out of its seat into immediate engagement with the die.

38. In a machine for making the eye members of snap fasteners, means provided with a non-rotatable seat for holding a socketed cup, means for receiving a spring formed with inside members after it has been bent to its final shape and mechanism for assembling the spring and cup, both of said means being movable in adjacent parallel planes from positions remote from each other to a position contiguous to each other in which latter position no part of the assembling mechanism is interposed between them and the spring is held in front of the cup preparatory to assembling the spring and cup.

39. A machine for making the eye members of snap fasteners, of the class wherein cups having laterally slit socketed portions and springs having inside members are conveyed from positions remote from each other and delivered to assembling instrumentalities characterized by the fact that the conveyer for the cups is provided with a non-rotatable seat and the conveyer for the springs receives the springs after they have been bent to their final shape and both conveyers are movable to bring the cups and springs to positions in alinement with each other, preparatory to being operated upon by the assembling instrumentalities, in which position the slits in the socketed portions of the cups and the inside members of the springs are disposed in the same direction, whereby when the cups and springs are brought together by the assembling instrumentalities so that the springs are contained in the cups the inside members will become positioned in the slits in the socketed portions.

40. A machine for making the eye members of snap fasteners of the class wherein springs having inside members are pushed into socketed cups by reciprocating instrumentalities characterized by the fact that the springs are successively brought into alinement with said instrumentalities by a conveying mechanism which receives the springs after they have been bent to their final shape and moves them in an edgewise direction only to a position contiguous to the open side of the cups.

41. In a machine for making the eye members of snap fasteners, assembling instrumentalities for bringing together springs formed with separable portions and cups formed with laterally slit socketed portions so that the springs are contained in the cups, the said instrumentalities comprehending a movable spreading device which operates by its movement to spread the separable portions of the springs to permit the passage of the socketed portions of the cups between them, in combination with sliding mechanism which operates by rectilinear motion for bringing the springs into alinement with said assembling instrumentalities, whereby the springs are positioned relative to said cups preparatory to said assembling operation.

42. In a machine for making the eye members of snap fasteners, instrumentalities for assembling springs formed with separable portions and cups formed with laterally slit socketed portions so that the springs are contained in the cups, the said instrumentalities comprising a spreading device which operates by its movement to spread the separable portions of the springs, in combination with a conveying device which is arranged to bring the cups in position relative to said springs to be operated on by said assembling instrumentalities without turning the cups in said conveying device.

43. In a machine for making the eye members of snap fasteners, assembling instrumentalities for bringing together springs formed with separable portions and cups formed with laterally slit socketed portions so that the springs are contained in the cups, the said instrumentalities comprehending a movable spreading device which operates by its movement to spread the separable portions of the springs, in combination with mechanism for flanging socketed eye blanks to form said cups and moving the cups so formed in a direction so that when they are brought into alinement with the assembling instrumentalities they will be positioned relative to said springs to be operated on by said instrumentalities.

44. In a machine for making the eye members of snap fasteners, assembling instrumentalities for bringing together springs formed with separable portions and cups formed with laterally slit socketed portions so that the springs are contained in the cups, in combination with conveying means for delivering said springs and cups to said assembling instrumentalities and holding them in position in alinement with each other preparatory to said assembling operation until they are positively engaged by said assembling instrumentalities.

45. In a machine for making the eye members of snap fasteners of the kind in which closing springs operate in laterally slit socketed portions of cups, instrumentalities for assembling said springs and cups including a die for curling the edges of the cups over the contained springs, in combination with means for discharging the cups from the die, and a conveying device provided with a cup-holding seat which receives the cup so discharged after the edge-curling operation is completed and moves it out of alinement with said die.

46. A machine for making the eye members of snap fasteners of the class wherein a spring and cup are assembled so that the edge of the cup is curled inwardly to confine the contained spring characterized by the fact that it is provided with a conveying device which first moves the cup into a position to be operated upon by instrumentalities which bring the cup and spring together so that the spring is contained in the cup, and then moves the cup into a position where it is operated upon by the edge-curling tools.

47. In a machine of the character described, a spring carrier having a shoulder for supporting the curved body portion of a spring, a clamp mounted in the carrier to act against the reversely-bent portions of the spring, means acting upon the clamp as the carrier is moved to present a spring to transferring position to clamp the spring, means for holding a cup or socket member in position to receive the spring, and means for transferring the spring from its clamped position in the carrier to the cup or socket member.

48. In a machine of the character described, the combination of the machine bed, a spring former, a spring carrier having a spring-receiving opening, means for projecting the former through the spring-receiving opening and withdrawing it therefrom, means for feeding a wire in front of the former, a bender slide carrying a member to conform the wire to the front of the former and side benders pivotally mounted on the slide, means for moving the slide toward the former to conform the wire to the front of the former and cut the wire, means for causing the side benders to act upon the wire at the sides of the former, and an end bender to engage and bend the ends of the wire, the spring-receiving opening of the carrier acting as the former is withdrawn to strip the spring wire from the former.

49. In a machine of the character described, the combination of a former, a carrier having an opening through which the former is movable, means for feeding wire in front of the former above the carrier when the former is projected through the opening in the carrier, means for guiding the wire, wire-bending means to conform the wire to the former including side benders, means for moving the side benders to cut the wire and then bend it about the sides of the former, and means for withdrawing the former from the opening in the carrier and the wire to leave the wire in the opening of the carrier.

50. In a machine of the character described, the combination of a carrier having an opening therethrough provided with a shoulder portion, a former, means for bending a wire about the former while the latter remains in fixed position above the carrier, and means for withdrawing the former through the opening in the carrier that the shoulder portion of the opening may engage the spring and strip it from the former.

51. In a machine of the character described, the combination of a carrier having an opening therethrough provided with a shoulder portion, a former, means for bending a wire about the former while the latter remains in fixed position above the carrier, means for withdrawing the former through the opening in the carrier that the shoulder portion of the opening may engage the spring and strip it from the former, means for moving the carrier to the spring-inserting station, and means acting upon the spring in the carrier to bend the ends downwardly and then to transfer the spring bodily from the carrier.

52. In a machine of the character described, the combination of means for forming in a fixed position the spring of a snap fastener, means acting after the spring has been formed in the fixed position to move the spring to the transferring position, a clamp to hold the spring from displacement relative to said moving means as it is moved to the transferring position, a clamp for holding a cup or socket member in a fixed position and in a predetermined relation to the spring held by the said means, and means for transferring the spring to the cup or socket member and acting to prevent disturbance of the established predetermined relation of the spring with respect to the cup or socket member as it is transferred thereto.

53. In a machine of the character described, the combination of means for moving a cup or socket member of a snap fastener to a spring inserting position and locking it from movement while in said position, a carrier having an opening for carrying a spring to the inserting position above the cup or socket member and locking the spring from movement while in said position, and a transferrer for forcing the spring from the carrier to the cup or socket member beneath and having a part to lock the spring from rotative movement as it is transferred to insure that the spring and cup or socket member will be in a predetermined relation when the spring is inserted therein.

54. In a machine of the character described, the combination of means for moving a cup or socket member of a snap fastener to a spring inserting position and locking it from movement while in said position, a carrier having an opening for carrying a spring to the inserting position above the cup or socket member and locking the spring from movement while in said position, a transferrer for forcing the spring from the carrier to the cup or socket member beneath, means for withdrawing the carrier from spring inserting position after withdrawal of the transferrer, a lifter for then moving the cup or socket member upward and an edge turner for acting upon the edge of the cup or socket member to turn the edge over the spring.

55. In a machine of the character described, the combination of relatively movable dies for forming a succession of bulges or cups in a metal strip, a guide for the metal strip secured in fixed position between the dies and having openings for the passage of the dies, a feeding pawl for engaging the bulges or cups after the metal strip has been treated by the dies to feed the strip longitudinally, and means for operating the pawl.

56. In a machine of the character described, the combination of a series of opposed dies, means for relatively moving the dies toward and from each other to form a series of bulges or cups in a metal strip fed longitudinally between the dies, a guide for the metal strip between the two series of dies, a pawl carrier, means for reciprocating the pawl carrier, and a pawl mounted on the carrier for engaging the bulges or cups formed in the metal strip by the dies to feed the strip longitudinally.

57. In a machine of the character described, the combination of opposed series of dies for forming bulges or cups in a metal strip, a pair of saws for slotting the bulges or cups as they are successively formed by the dies, and means between the dies and saws for feeding the strip between the dies for the formation of the bulges or cups and then to the saws for forming the slots in the bulges or cups.

58. In a machine for the manufacture of parts of spring press button fasteners, a conveyer for eyelets, a tool for turning over a part of an eyelet to retain a spring in position by the eyelet, means for raising an eyelet from the conveyer into engagement with the tool, means for replacing the eyelet into the conveyer, and means for adjusting the distance an eyelet is raised from the conveyer, to regulate the thickness of the finished eyelet.

59. The combination of a former having a recess therein and means for bending wire or the like upon the former to form a spring comprising a movable member fitting the exterior of said former, other members movable at an angle thereto to a different portion of said former, and a third bending member movable into said recess, said three spring bending members having spring engaging portions and being movable successively.

60. In a machine for making snap fasteners, a support for socketed cups, means for forming wire springs adjacent to the support, each spring having a curved peripheral member and inner separable members, a holder for the springs having an opening therethrough in which a spring is retained by the tension of the spring holding its peripheral member against the wall of the opening in the holder, means for moving the holder to carry the spring therein into alinement with a cup on said support, and mechanism for assembling a spring and a cup, the said mechanism including a member which is moved through the opening in the holder to engage the spring therein and carry it bodily out of the holder and into the cup.

61. In a machine for making the eye-members of snap fasteners, means for holding socketed cups, means for holding springs formed with curved peripheral members and separable inner members in front of the cups in a position in which the distance between the said separable members is less than the width of the socketed portions of the cups and assembling mechanism which operates to swing the separable members of the springs out of the plane of their peripheral members in a direction toward the open side of the cups and then moves the springs bodily toward the open side of the cups whereby the space between said separable members is widened and the bodily movement of the springs carries their separable members over the socketed portions of the cups during the assembling operation.

62. In a machine for making the eye-members of snap fasteners, assembling instrumentalities for bringing together wire springs formed with curved peripheral members and separable inner members and cups formed with laterally slit socketed portions, the said instrumentalities operating to advance said separable members beyond the plane of their peripheral members and to impart a bodily movement to the springs toward the open side of the cups, in combination with a support for the springs provided with means for seating said peripheral members, the said means being shaped to hold the peripheral members during the initial movement of the separable members and to release the peripheral members when bodily movement is imparted to the springs whereby the springs are stripped from the support and their separable members are moved over the socketed portions of the cups during the assembling operation.

63. In a machine for making snap fasteners, means for supporting cups having laterally slit socketed portions, means for supporting springs in alinement with the cups, said springs having curved outer members and separable inner members, a reciprocating mechanism for positioning the springs in the cups so that the separable inner members are seated in the slits in the sockets, the said reciprocating mechanism being provided with a portion which is shaped to engage the outer members of the springs and to follow the same into the cups during the positioning operation.

64. A machine for making the socket members of snap fasteners comprising the combination of a support having a plurality of receptacles for cups therein, means for rotating the support step by step, means for feeding to the support a metal strip having integral studs raised thereon, reciprocating devices mounted in alinement with a receptacle of the support when the latter comes to rest and operating in the periods of rest of the step by step movement to punch disks each including a stud from the strip and force each disk into a receptacle of the support to cup the disk, reciprocating devices mounted in alinement with a receptacle of the support when the latter comes to rest and operating in said periods for moving springs bodily into the cups carried by the receptacles of the support, a die mounted in alinement with a receptacle of the support when the latter comes to rest, and means operating in said period for moving a cup with a spring therein out of a receptacle in the support and into engagement with the die to curl the edge of the cup over the spring therein.

65. In a machine for making the socket members of snap fasteners, the combination of a support for socketed cups, means for moving the support step by step, mechanism mounted adjacent to the support for forming springs each having a curved peripheral member and separable inner members, means for moving each of the formed springs laterally over the support including a holder for the springs having an opening therethrough whose wall engages the peripheral member of the spring to hold the spring in the opening, and a member which is reciprocated through the opening in the holder to engage the spring therein and carry it out of the holder and into a cup on the support.

66. In a machine for making the socket members of snap fasteners, the combination of a support for socketed cups, means for moving the support step-by-step, mechanism mounted adjacent to the support for forming springs, means for moving the springs laterally over the support including a holder for the springs having an opening therethrough, and means for moving the holder to a spring-receiving position and a spring-assembling position, a plunger in the spring-assembling position of the holder, means for moving the plunger through the opening in the holder to engage the spring therein and carry it out of the holder and into a cup on the support and for then returning the plunger, and means for thereafter returning the holder to the spring-receiving position to receive another spring.

67. In a machine for making the socket members of snap fasteners, the combination of a support for socketed cups, means for moving the support step-by-step, mechanism mounted adjacent to the support for forming springs, each having a curved peripheral member and separable inner members, means for moving the springs laterally over the support including a holder for the springs having an opening therethrough, a plunger, and means for moving the plunger through the opening in the holder to engage the spring therein and carry it out of the holder and into a cup on the support, said plunger having its end formed to depress the inner members of the spring in advance of the peripheral member thereof.

68. In a machine for making the socket members of snap fasteners, the combination of a support for socketed cups, mechanism adjacent to the support for forming springs each having a curved peripheral member and separable inner members, means for transferring the springs from said mechanism to a position over the support including a holder for the spring having an opening therethrough and a groove in the wall of the opening to receive the peripheral member of the spring, and a reciprocating plunger movable through the opening in the holder to engage the spring therein and move it bodily from the holder into a socketed cup.

69. In a machine for making the socket members of snap fasteners, the combination of a support for socketed cups, mechanism adjacent to the support for forming springs each having a curved peripheral member and separable inner members, means for transferring the springs from said mechanism to a position over the support including a holder for the spring having an opening therethrough and a groove in the wall of the opening to receive the peripheral member of the spring, and a reciprocating plunger movable through the opening in the holder to engage the spring therein and move it bodily from the holder into a socketed cup, the said plunger being formed to move the inner members of a spring in advance of the peripheral member to spread said inner members.

70. In a machine for making the socket members of snap fasteners, the combination of a support for socketed cups, mechanism adjacent to the support for forming springs, each having a curved peripheral member and separable inner members, a holder for holding the springs by gripping the peripheral members thereof while leaving the inner members free, means for moving the holder and a spring therein over the support and a reciprocating member arranged to pass through said holder and to move the spring held thereby bodily into a socketed cup.

71. In a machine for making the socket members of snap fasteners, the combination of a support for socketed cups, mechanism adjacent to the support for forming springs each having a curved peripheral member and separable inner members, a holder for holding the springs by gripping the peripheral members thereof while leaving the inner members free, means for moving the holder and a spring therein over the support and a reciprocating member arranged to pass through said holder and to move the spring held thereby bodily into a socketed cup, said member having its end formed to move the inner members of a spring in advance of the peripheral member thereof to spread the inner members.

72. A machine for making the socket members of snap fasteners comprising the combination of a support having a plurality of receptacles for cups therein, means for rotating the support step-by-step, means for feeding to the support a metal strip having integral studs raised thereon, reciprocating devices mounted in alinement with a receptacle of the support when the latter comes to rest and operating in the periods of rest of the step-by-step movement to punch disks each including a stud from the strip and force each disk into a receptacle of the support to cup the disk, reciprocating devices mounted in alinement with a receptacle of the support when the latter comes to rest and operating in said periods for moving springs bodily into the cups carried by the receptacles of the support, and reciprocating devices mounted in alinement with a receptacle of the support when the latter comes to rest and operating in said periods to curl the edges of the cups over the springs therein.

73. A machine for making the socket members of snap fasteners comprising the combination of a support having a plurality of receptacles for cups therein, means for rotating the support step-by-step, means for feeding to the support a metal strip having integral studs raised thereon, reciprocating devices mounted in alinement with a receptacle of the support when the latter comes to rest and operating in the periods of rest of the step-by-step movement to punch disks, each including a stud from the strip and force each disk into a receptacle of the support to cup the disk, spring-forming mechanism adjacent to the support, means for moving a formed spring from said mechanism over the support including a holder for the spring having an opening therethrough, a reciprocating member mounted in alinement with a receptacle of the support when the latter comes to rest and movable in said periods through the opening in the said holder to move a spring therefrom and into a cup in the alined receptacle of the support, and reciprocating devices mounted in alinement with a receptacle of the support when the latter comes to rest and operating in said periods to curl the edges of the cups over the springs therein.

74. A machine for making the socket members of snap fasteners, comprising the combination of a support having a plurality of receptacles for cups therein, means for rotating the support step-by-step, means for feeding to the support a metal strip having integral studs raised thereon, cup-forming mechanism for punching disks each including a stud from the strip, and forcing each disk into a receptacle of the support to form it into a cup, assembling mechanism for moving springs bodily into cups in receptacles of the support, curling mechanism for curling the edges of the cups over the springs, the said three mechanisms being mounted over said support in positions to aline with receptacles of the support in the periods of rest of the step-by-step movement of the support, and means for operating the said three mechanisms during the periods of rest.

75. In a snap fastener machine, means for supporting socketed cups, means for supporting springs each having a curved peripheral member and separable inner members and a reciprocating device for pushing a spring into a cup, the operative end of said device having a recess to receive the socket of the cup, portions adjacent to the recess for engaging the inner members of a spring, and portions distant from the recess for engaging the peripheral member of the spring, the portions for engaging the inner members of the spring being in advance of the portions for engaging the peripheral member whereby the inner members of the spring are moved toward the cup in advance of the peripheral member.

76. In a snap fastener machine, the combination of a former which has a curved surface on one side and is recessed on the other side, a feeder for feeding a piece of wire across the curved side of the former, means for bending the piece of wire to a U-shape about the curved side of the former, means for engaging the end portions of the U-shaped piece of wire and moving them toward each other, and means for forcing portions of the piece of wire near the ends thereof into the recessed portion of the former.

77. In a snap fastener machine, the combination of a former which has a curved surface on one side and is recessed on the other side, a feeder for feeding a piece of wire across the curved side of the former, means for bending the piece of wire to a U-shape about the curved side of the former, means for engaging the end portions of the U-shaped piece of wire and moving them toward each other, means for forcing portions of the piece of wire near the ends thereof into the recessed portion of the former, mechanism for moving the former longitudinally to withdraw it from within the formed spring, assembling devices for inserting the springs in socketed cups and transferring devices for moving the formed springs laterally to the assembling devices.

78. In a snap fastener machine, the combination of a former which has a curved surface on one side and is recessed on the other side, a feeder for feeding a piece of wire across the curved side of the former, a slide, a pair of levers pivotally mounted thereon, means for moving the slide and the levers thereon and thereby bending the piece of wire about the curved side of the former, means for rocking the levers about their pivots to cause them to engage the end portions of the wire and move them toward each other, a reciprocating member mounted opposite the recessed side of the former and means for moving said member to cause it to force portions of the piece of wire near the ends thereof into the recessed portion of the former.

79. In a snap fastener machine, the combination of a former which has a curved surface on one side and is recessed on the other side, a feeder for feeding a piece of wire across the curved side of the former, a slide, a pair of levers pivotally mounted thereon, means for moving the slide and the levers thereon and thereby bending the piece of wire about the curved side of the former, means for rocking the levers about their pivots to cause them to engage the end portions of the wire and move them toward each other, a reciprocating member mounted opposite the recessed side of the former, means for moving said member to cause it to force portions of the piece of wire near the ends thereof into the recessed portion of the former, mechanism for moving the former longitudinally to withdraw it from within the formed spring, assembling devices for inserting springs in socketed cups and transferring devices for moving the formed springs laterally to the assembling devices.

80. In a snap fastener machine, the combination of a former which has a curved surface on one side and is recessed on the other side, a feeder for feeding a piece of wire across the curved side of the former, a die, means for moving the die to force the central portion of the piece of wire against the curved side of the former, a slide, a pair of levers pivotally mounted thereon, means for moving the slide, means for turning the levers on their pivots to cause them to engage the end portions of the piece of wire and move them toward each other, a reciprocating member mounted opposite the recessed side of the former and means for moving said member to cause it to force portions of the piece of wire near the ends thereof into the recessed portion of the former.

81. In a snap fastener machine, the combination of a former which has a curved surface on one side and is recessed on the other side, a feeder for feeding a piece of wire across the curved side of the former, a die movable toward the curved side of the former for bending the piece of wire to a U-shape about the former, devices movable toward each other and transverse to the movement of the die to engage the end portions of the piece of wire and move them toward each other, and a second die movable toward the recessed side of the former to force portions of the piece of wire near the ends thereof into the recessed portion of the former.

82. In a snap fastener machine, the combination of a former which has a curved surface on one side and is recessed on the other side, a feeder for feeding a piece of wire across the curved side of the former, means for bending the piece of wire to a U-shape about the curved side of the former, devices movable toward each other into engagement with the end portions of the U-shaped piece of wire to move those end portions toward each other, and a die movable toward the recessed side of the former to force portions of the piece of wire near the ends thereof into the recessed portion of the former.

83. In a snap fastener machine, the combination of a former which has a curved surface on one side and is recessed on the other side, a feeder for feeding a piece of wire across the curved side of the former, means for bending the piece of wire to a U-shape about the curved side of the former, devices movable toward each other into engagement with the end portions of the U-shaped piece of wire to move those end portions toward each other, a die movable toward the recessed side of the former to force portions of the piece of wire near the ends thereof into the recessed portion of the former, mechanism for moving the former longitudinally to withdraw it from within the formed spring, assembling devices for inserting the springs in socketed cups, and transferring devices for moving the formed springs laterally to the assembling devices.

84. In a snap fastener machine, the combination of a former which has a curved surface on one side and is recessed on the other side, a feeder for feeding a piece of wire across the curved side of the former, a pair of pivoted levers, means for moving the levers to carry their ends along opposite sides of the former, means for turning the said levers on their pivots to carry their ends into engagement with the end portions of a U-shaped piece of wire on the former and move those end portions toward each other, and a die movable toward the recessed side of the former to force portions of the piece of wire near the ends thereof into the recessed portion of the former.

85. In a snap fastener machine, the combination of a former which has a curved surface on one side and is recessed on the other side, a feeder for feeding a piece of wire across the curved side of the former, a pair of pivoted levers, means for moving the levers to carry their ends along opposite sides of the former, means for turning the said levers on their pivots to carry their ends into engagement with the end portions of a U-shaped piece of wire on the former and move those end portions toward each other, a die movable toward the recessed side of the former to force portions of the piece of wire near the ends thereof into the recessed portion of the former, mechanism for moving the former longitudinally to withdraw it from within the formed spring, assembling devices for inserting the springs into socketed cups and transferring devices for moving the formed springs laterally to the assembling devices.

86. In a snap fastener machine, the combination of a former which has a curved surface on one side and is recessed on the other side, a feeder for feeding a piece of wire across the curved side of the former, and three wire-bending mechanisms operating successively on the piece of wire to first bend it to a U-shape about the curved side of the former, then move the end portions of the piece of wire toward each other and then move portions of the piece of wire near the ends thereof into the recessed portion of the former.

87. In a snap fastener machine, the combination of a former which has a curved surface on one side and is recessed on the other side, a feeder for feeding a piece of wire across the curved side of the former, three wire-bending mechanisms operating successively on the piece of wire to first bend it to a U-shape about the curved side of the former, then move the end portions of the piece of wire toward each other and then move portions of the piece of wire near the ends thereof into the recessed portion of the former, mechanism for moving the former longitudinally to withdraw it from within a formed spring, assembling devices for inserting the springs into socketed cups, and transferring devices for moving the formed springs laterally to the assembling devices.

88. In a snap fastener machine, the combination of a former which has a curved surface on one side and is recessed on the other side, a feeder for feeding a piece of wire across the curved side of the former, three wire-bending mechanisms operating successively on the piece of wire to first bend it to a U-shape about the curved side of the former, then move the end portions of the piece of wire toward each other and then move portions of the piece of wire near the ends thereof into the recessed portion of the former, means for withdrawing the former from within a formed spring and for gripping the spring by the curved peripheral portion thereof, means for moving the spring so gripped laterally, a support for a socketed cup and a reciprocating plunger adapted to engage the spring so gripped and move it bodily into a cup on said support.

89. A machine for forming springs suitable to be introduced into snap fastener eye-blanks in which a pair of pivoted jaws coact with relatively fixed bending devices for imparting oppositely disposed bends to a wire which has first been bent U-shape, characterized by the fact that it is provided with movable means separate from said jaws for imparting reëntrant bends to the wire.

90. A machine for forming springs suitable to be introduced into snap fastener eye-blanks in which a pair of pivoted jaws are moved in their open position around a relatively fixed bending device and then closed on said bending device to impart bends to a length of wire characterized by the fact that the said bending device has reëntrant portions into which moving means separate from said pivoted jaws are advanced to impart reëntrant bends to the wire.

91. A machine for forming springs suitable to be introduced into snap fastener eye-blanks in which a pair of pivoted jaws and movable means coact with relatively fixed bending devices to impart a pair of oppositely disposed and a pair of reëntrant bends to a wire which has first been bent U-shape, characterized in that the pivoted jaws and movable means are carried by slides which move said jaws and movable means toward the bending devices from opposite directions.

92. In a snap fastener machine, the combination of a former which has a curved surface on one side and two curved recesses on the other side, a pair of levers mounted with their ends at opposite sides of the former, means for feeding a piece of wire along the curved side of the former, operating devices for moving the former and the ends of the levers relatively so that the ends of the levers pass along opposite sides of the former to bend the piece of wire to a U-shape about the curved side of the former, means for moving the ends of the levers toward each other to carry the end portions of the piece of wire toward each other and means for forcing portions of the piece of wire near the ends thereof into the two recesses in the former so that those portions of the piece of wire conform to the shape of said recesses.

93. In a machine for making socket-members of snap fasteners, a spring-forming mechanism and means for inserting the springs formed thereby in socketed cups, said spring-forming mechanism comprising the combination of a former which has a curved surface on one side and two curved recesses on the other side, means for feeding a piece of wire across the curved surface of the former, means for bending the wire about the curved surface of the former so that its end portions project from the former on the side thereof away from the said curved surface, and means for forcing portions of the piece of wire near the ends thereof into the said recesses in the former so that they conform in shape to the surfaces of the recesses.

94. In a machine for making socket members of snap fasteners, a spring-forming mechanism and means for inserting the springs formed thereby in socketed cups, said spring-forming mechanism comprising the combination of a former which has a curved surface on one side and two curved recesses on the other side, means for feeding a piece of wire across the curved surface of the former, means for bending the wire about the curved surface of the former so that its end portions project from the former on the side thereof away from the said curved surface, a die mounted opposite the recessed side of the former, and means for advancing the die toward the former to engage portions of the piece of wire near the ends thereof and force them into the said recesses in the former.

95. In a machine for making socket members of snap fasteners, a spring-forming mechanism and means for inserting the springs formed thereby in socketed cups, said spring-forming mechanism comprising the combination of a former which has a curved surface on one side and on the other side has a projecting wall and two curved recesses on opposite sides of the wall, means for feeding a piece of wire across the curved surface of the former, means for bending the piece of wire about the former, and means for forcing portions of the piece of wire near the ends thereof into the said recesses in the former and along opposite sides of the projecting wall on the former so that they conform in shape to the surfaces of the recesses and the sides of the projecting wall.

96. In a machine for making socket-members of snap-fasteners, a spring-forming mechanism and means for inserting the springs formed thereby in socketed cups, said spring-forming mechanism comprising the combination of a former which has a curved surface on one side and on the other side has a projecting wall and two curved recesses on opposite sides of the wall, means for feeding a piece of wire across the curved surface of the former, means for bending the piece of wire about the former, a die mounted opposite the recessed side of the former and having at its end two projections and a recess between the projections to receive said wall on the former, and means for moving the die toward the former into engagement with the piece of wire to bend portions of the wire near the ends of the piece to conform to the shape of said recesses in the former and the sides of said wall on the former.

In testimony whereof I have hereunto set my hand this 15th day of March, 1916.

MAX F. KIESSLING.